United States Patent [19]

Sawahashi et al.

[11] Patent Number: 5,694,388
[45] Date of Patent: Dec. 2, 1997

[54] CDMA DEMODULATOR AND DEMODULATION METHOD

[75] Inventors: Mamoru Sawahashi, Yokosuka; Hidehiro Andou; Fumiyuki Adachi, both of Yokohama, all of Japan

[73] Assignee: NTT Mobile Communications Network Inc., Tokyo, Japan

[21] Appl. No.: 564,116

[22] PCT Filed: Jun. 22, 1995

[86] PCT No.: PCT/JP95/01252

§ 371 Date: Nov. 22, 1995

§ 102(e) Date: Nov. 22, 1995

[87] PCT Pub. No.: WO96/00471

PCT Pub. Date: Jan. 4, 1996

[30] Foreign Application Priority Data

Jun. 23, 1994 [JP] Japan .................................. 6-141994
Dec. 27, 1994 [JP] Japan .................................. 6-326261
Jan. 12, 1995 [JP] Japan .................................. 7-003559

[51] Int. Cl.$^6$ .............................. H04B 7/216; H04J 13/02
[52] U.S. Cl. .......................... 370/206; 370/335; 370/342; 375/206; 375/207; 375/210
[58] Field of Search .................................. 375/200, 205, 375/206, 324, 325, 340, 341, 342, 343, 207, 208, 209, 210; 379/58, 59, 63; 455/13.4, 33.1, 38.3, 53.1, 54.1, 56.1; 370/201, 203, 206, 207, 208, 335, 337, 342, 347, 479, 498, 500

[56] References Cited

U.S. PATENT DOCUMENTS

| | | | |
|---|---|---|---|
| 5,329,547 | 7/1994 | Ling | 375/205 |
| 5,383,220 | 1/1995 | Murai | 375/206 |
| 5,414,728 | 5/1995 | Zehavi | 375/200 |
| 5,544,156 | 8/1996 | Teder et al. | 370/18 |
| 5,559,789 | 9/1996 | Nakano et al. | 370/18 |
| 5,570,353 | 10/1996 | Keskitalo et al. | 370/18 |

FOREIGN PATENT DOCUMENTS 5-227124  9/1993  Japan.

OTHER PUBLICATIONS

IEICE 1994 Spring Convention Lecture Transaction, vol. 2, Lecture No. B-419, p. 419 (English Abstract) "DS/CDMA Coherent Detection System with Suppressed Pilot Channel", Mar. 1994.

IEICE Technical Report RCS93-76, pp. 47-54, (English Abstract) "DS/CDMA Adaptive Interference Canceller in Mobile Radio Environments", Nov., 1993.

The Transaction of the Institute of Electronics Information Communication Engineers of Japan, B-II, vol. J72-B-II No. 1, pp. 7-15 "Rayleigh Fading Compensation Method for 16QAM Modem in Digital Land Mobile Radio Systems", Jan., 1989.

IEEE Transactions on Vehicular Technology May, 1993 vol. 42, No. 2, pp. 137-147 "Rayleigh Fading Compensation for QAM in Land Mobile Radio Communications".

*Primary Examiner*—Alpus H. Hsu
*Attorney, Agent, or Firm*—George P. Hoare, Jr.; Rogers & Wells

[57] ABSTRACT

A CDMA demodulator which can follow fast fading, and reduce interference components from other users in the same cell. A received input spread signal is despread by an orthogonal filer (103). The orthogonal filer provides the input spread signal with successive delays each of an amount of 1/m of the chip interval of a spreading code, multiplies the delayed signals by tap coefficients, and sums up the products, thereby outputting the despread signal. Pilot symbols in the despread signal are compared with known pattern pilot symbols by an absolute phase estimator/phase error compensator (107) to obtain phase fluctuations of the received pilot symbols. The phase fluctuations are interpolated to each information symbol, and each information symbol is phase compensated. The phase compensated information symbols are decided by a decision block (108). The tap coefficients are calculated by a tap coefficient controller (110) so that the mean square error of differences between signals before and after the decision is kept minimum, and the calculated values are fed back to the orthogonal filter.

38 Claims, 19 Drawing Sheets

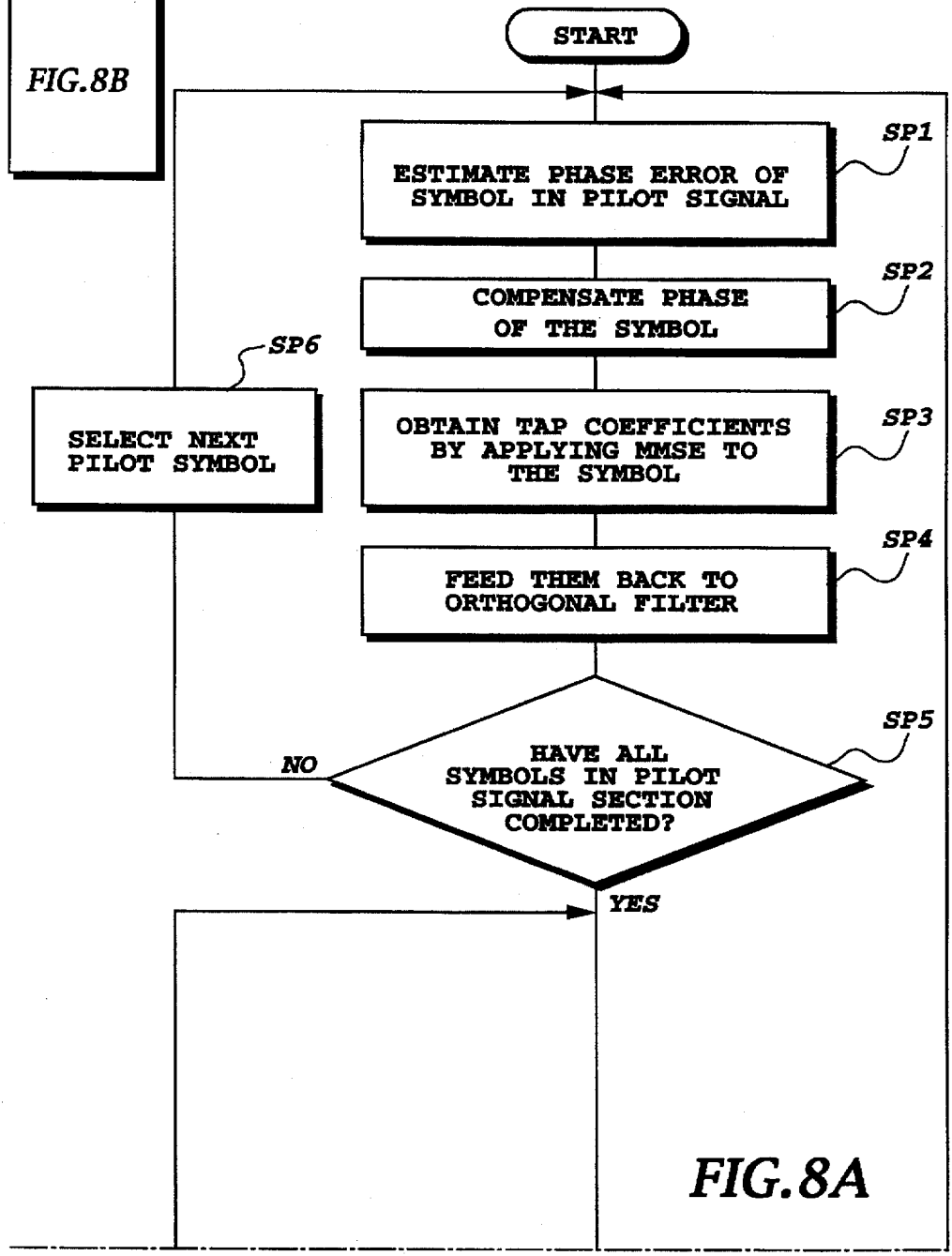

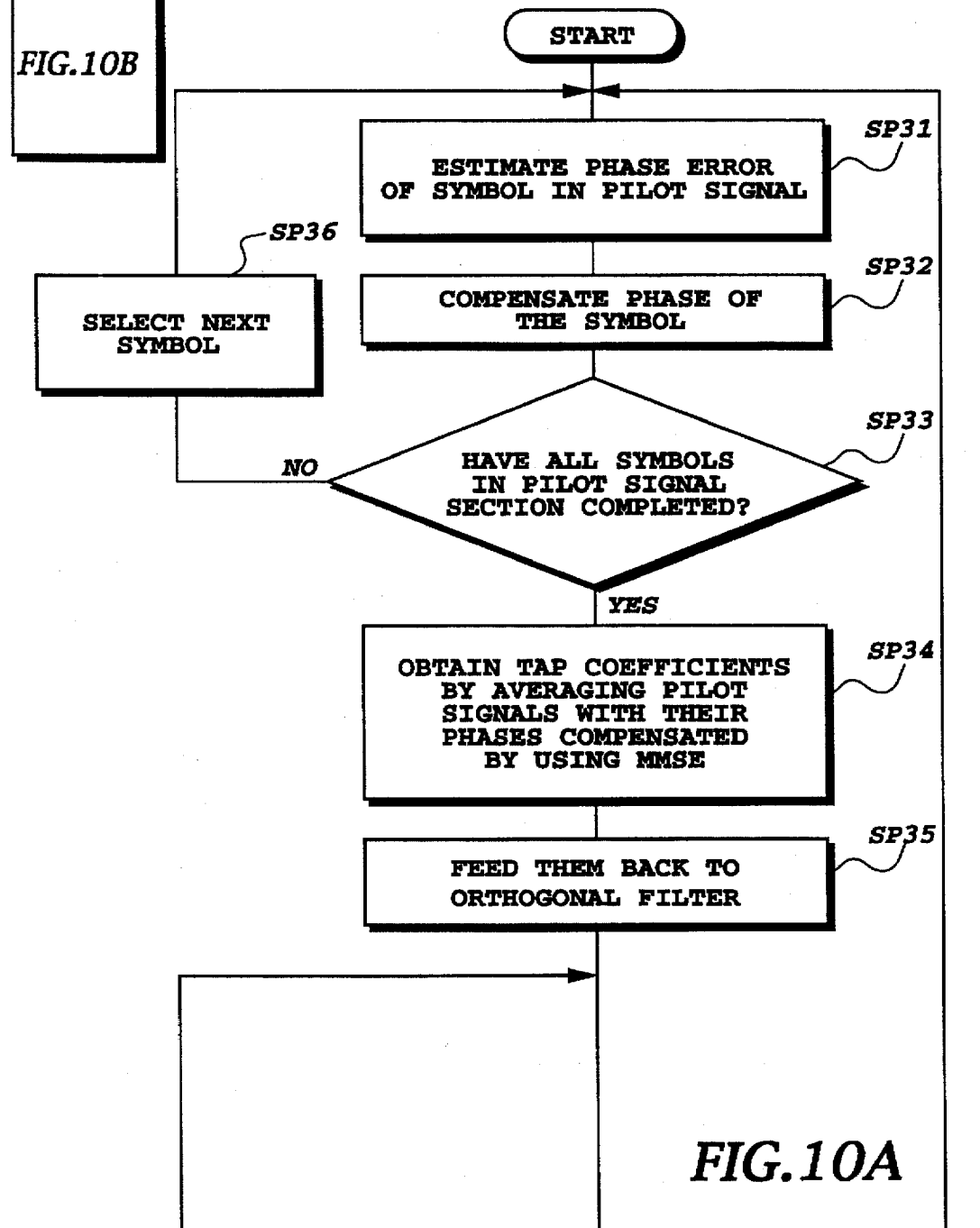

CDMA DEMODULATOR AND DEMODULATION METHOD

TECHNICAL FIELD

The present invention relates to a wireless receiver used in digital mobile communications, and more particularly to a CDMA (Code Division Multiple Access) demodulator and demodulation method preferably employed in a spread spectrum CDMA receiver.

BACKGROUND ART

In a spread spectrum CDMA wireless system, a transmitter carries out a normal modulation of a transmitted signal followed by a second modulation using a spreading code, and sends out the wideband spread signal. A receiver, on the other hand, receiving a signal including a number of wideband spread signals, recovers a desired signal by converting one of the wideband signals into a narrowband signal through a process called despreading, and by carrying out a normal demodulation of the narrowband signal. The despreading process selectively produces only a desired received signal by detecting and utilizing a correlation between a spreading code in the received signal and the spreading code generated in the receiver. As a typical device for detecting the correlation, matched filters are well known. If no cross-correlations are present among the spreading codes, the matched filters will produce only autocorrelation of the desired signal. In general, however, since some cross-correlations are present among the spreading codes, the cross-correlation components are inevitably introduced into the despread output.

Besides, a signal of an intended channel can have cross-correlations between signals arriving through multiple transmission paths. FIG. 1 illustrates correlations in the case of three paths. The correlation of the first path signal is detected with a matched filter using a spreading code as tap coefficients. Since a second path signal and a third path signal differ in timing from the first path signal in this correlation detection, they are considered to have been despread with different spreading codes. As a result, the first signal will suffer interference caused by the cross-correlation between the first path signal and the second and third path signals. Incidentally, D(n) designates an n-th symbol in FIG. 1.

A method for minimizing such cross-correlations is disclosed in Yoshida, et al. "DS/CDMA adaptive interference canceller suitable for mobile communication environment," Technical Report of the Institute of Electronics, Information and Communication Engineers of Japan, 93-76 (1993-11).

FIG. 2 shows a configuration for implementing the method. An orthogonal filter 3 has a tap length of a several symbol interval, and operates at a rate of m times the chip rate of the spreading code, where m is a positive integer. The orthogonal filter 3 is provided with a spread signal at an input terminal 1, extracts a signal for this station by despreading, and supplies it to a differential detector 7 as a narrowband despread signal. The output of the differential detector 7 is supplied to a decision block 11, so that decision data are produced from an output terminal 2 as a decoded output. The decision data are also fed to an error vector calculator 12 which calculates the differences between the decision data and the output of the differential detector 7. The differences are fed to a tap coefficient controller 14 after they are converted into linear values by an error vector/linear quantity converter 13. The tap coefficient controller 14 adaptively calculates tap coefficients that are orthogonal to the spreading codes of all the other stations, and feeds them back to the orthogonal filter 3. The adaptive control of the tap coefficient is carried out at a symbol interval, and the demodulation output is also obtained at the symbol interval. Thus, the interference components from the other stations are eliminated, and only the intended received signal is extracted.

The adaptive control of the orthogonal filter 3, however, cannot follow fast fluctuations in the transmission path due to Rayleigh fading when it is applied to mobile communications in a Rayleigh fading environment. Taking account of this, the system employs the differential detector 7 to separate the cross-correlation canceling function from the fading tracking function of the orthogonal filter 3, thereby improving the tracking characteristic for the fading. Accordingly, the configuration of FIG. 2 can implement a demodulator capable of tracking fast fading, and the demodulation characteristics depend on the characteristics of the delay detection.

In the delay detection, however, a bit error at the receiver side causes a two-bit error of the original signal, because the information signal is transmitted after it undergoes differential encoding at the transmitter side. As a result, the error rate characteristic of the delay detection is inferior to that of the absolute coherent detection by 3 dB. Since the CDMA considers the received signal from other stations as random noise, the capacity in terms of the number of subscribers of the system will be reduced with an increase in the transmit power of the other stations. In other words, the capacity in terms of the number of subscribers can be increased by an amount corresponding to the reduction in the transmit power of the other stations by utilizing a demodulation method with a high received Eb/No (energy per bit to noise spectral density). Thus, the absolute coherent detection enables the system to increase the capacity in terms of the number of subscribers as compared with the system employing the delay detection.

In the digital mobile communications, however, fast estimation of the transfer functions of the propagation paths is required to obtain at the receiving side the absolute phase of the transmitting carrier necessary for the coherent detection because the transfer functions of the propagation paths have great temporal fluctuations with the movement of the transceiver of the mobile station.

An interpolation coherent detection method is known which carries out coherence detection by fast estimating the transfer functions of the propagation paths. For example, it is disclosed in S. Sampei, "Fading Distortion Compensation Method for 16 QAM in Land Communications," the Transaction of the Institute of Electronics, Information and Communication Engineers of Japan, B-II Vol. J72-B-II pp. 7–15, January, 1989, or in its revised version, S. Sampei et al., "Rayleigh Fading Compensation for QAM in Land Mobile Radio Communications, " IEEE Transactions on Vehicular Technology, VOL. 42, No.2, May, 1993.

FIG. 3 shows an example of a signal format used in such an interpolation coherent detection. A transmitter sends pilot signals P periodically inserted between information signals D. The pilot signals P consist of one or more symbols whose patterns are known both to the transmitter side and the receiver side. A pilot signal P and an adjacent information signal D constitute one frame.

FIG. 4 shows a conventional receiver. Radio waves received by an antenna 21 are band limited by a BPF (BandPass Filter) 22 to such an extent that an intended received signal suffers no distortion. The band suppressed received signal is corrected to a normal level signal by an AGC (Automatic Gain Control) circuit 23, and the offset frequency between the carrier and a local oscillator is coarsely reduced by an AFC (Automatic Frequency Controller) 24. The BPF 22 is provided for ensuring the normal operation of the AGC 23 and the AFC 24.

Subsequently, the received signal undergoes quasi-coherent quadrature detection by a quasi-coherent quadrature detector 25 using a local signal from a local oscillator 26, which has the same frequency as the carrier of the received signal. By this, the wideband signal is converted into a narrowband despread signal. The output of the quasi-coherent quadrature detector 25 is supplied to an interpolation compensator 29 through an LPF (Low Pass Filter) 27 and an A/D converter 28. The LPF 27 is provided for suppressing noise from external bands and interference from adjacent channels. The interpolation compensator 29 estimates for each information symbol a transfer function by an interpolation method using the pilot signals, and compensates individual information symbols using the estimated transfer functions. The compensated signal undergoes decision by a decision block 30. Thus, compensating each information symbol with the estimated transfer function enables the absolute phase detection. As a typical interpolation method, a first-order interpolation using two pilot signals, or a second-order interpolation using three pilot signals, is generally used.

When the received signal includes noise, more accurate estimation of the transfer functions could be achieved with an increase in the number of symbols per pilot signal, thereby reducing the estimation error of the transfer functions. Estimation of the transfer function of each information symbol can be carried out by applying the first-order or second-order Gaussian interpolation to the transfer functions estimated from the pilot signals.

In the conventional system described above, the transfer function of each information symbol can be estimated by a simple first-order interpolation when the fluctuations of the transfer functions of the propagation paths are much slower than the insertion period of the pilot signals. However, as the fluctuations of the transfer functions grow faster, the interpolation error increases, and hence, the insertion period of the pilot signal must be shortened. The reduction of the insertion period, however, increases the number of symbols per pilot signal, and this will reduce the transmission efficiency. On the other hand, to shorten the insertion period while keeping the transmission efficiency constant, the number of symbols per pilot signal must be reduced, and this will increase the estimation error of the transfer functions.

Thus, the conventional interpolation coherent detection has a shortage in that the transmission efficiency is reduced to cope with the fast changes in the transfer functions of the propagation paths. Furthermore, it cannot satisfactorily reduce the interference from other users in the same cell.

DISCLOSURE OF THE INVENTION

Therefore, it is an object of the present invention to provide a CDMA demodulator and demodulation method which can employ absolute coherent detection as a demodulation method, and can follow fast fading and reduce the interference from other users in the same cell.

In a first aspect of the present invention, there is provided a CDMA (Code Division Multiple Access) demodulator used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, the CDMA demodulator, which demodulates the spread signal by using the spreading code, comprising:

an orthogonal filter including a plurality of delay elements, a plurality of multipliers and an adder, the delay elements providing the spread signal with successive delays each of an amount of 1/m of a chip interval of the spreading code, where m is a positive integer, the multipliers multiplying the spread signal and successively delayed spread signals by tap coefficients obtained on the basis of the spreading code, and the adder summing up outputs of the multipliers, the orthogonal filter despreading the spread signal to generate a despread signal;

absolute phase estimating means for estimating received phases of a received pilot signal by comparing the received pilot signal included in the despread signal with the pilot signal of a known pattern, and for estimating a received phase of each information symbol in the information signal by interpolating the received phases of the received pilot signal;

phase error compensation means for compensating received phase errors of the received pilot signal on the basis of estimated received phases of the received pilot signal, and for compensating a phase error of each the information symbol on the basis of an estimated received phase of the information symbol;

decision means for deciding the pilot signal whose phase has been compensated, and for deciding the information symbol whose phase has been compensated; and tap coefficient control means for calculating the tap coefficients which will minimize a mean square error of difference between an output of the phase error compensation means and an output of the decision means, and for feeding the tap coefficients to the orthogonal filter.

The tap coefficient control means may calculate the tap coefficients that will minimize the mean square error for each symbol in the pilot signal, and may calculate the tap coefficients that will minimize the mean square error for each symbol in the information signal.

The tap coefficient control means may calculate the tap coefficients that will minimize the mean square error for each pilot signal.

The tap coefficient control means may calculate the tap coefficients that will minimize the mean square error for each pilot signal, and may calculate the tap coefficients that will minimize the mean square error for each symbol in the information signal.

In a second aspect of the present invention, there is provided a CDMA (Code Division Multiple Access) demodulator of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in a multiple access transmission, the CDMA demodulator comprising:

a pilot channel demodulating portion for demodulating the pilot channel; and a traffic channel demodulating portion provided for each the traffic channel for demodulating the traffic channel, wherein the pilot channel demodulating portion comprises:

a pilot channel orthogonal filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel;

phase error estimating/averaging means for estimating received phases of individual received pilot symbols of a received pilot signal included in the despread signal of the pilot channel by comparing the received pilot signal with the pilot signal of a known pattern of the pilot channel, and for obtaining phase differences between the received pilot symbols and an average signal obtained by averaging the received phases of the received pilot symbols; and pilot channel tap coefficient control means for calculating the tap coefficients of the pilot channel, which will minimize a mean square error of the phase differences between the received pilot symbols and the average signal, and for feeding the tap coefficients to the pilot channel orthogonal filter, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each the information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises decision means for deciding information symbols whose phases have been compensated; and the traffic channel tap coefficient control means calculates the tap coefficients that will minimize a mean square error of difference between the information symbols whose phases have been compensated and information symbols outputted from the decision means.

In a third aspect of the present invention, there is provided a CDMA (Code Division Multiple Access) demodulator of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in a multiple access transmission, the CDMA demodulator comprising:

a pilot channel demodulating portion for demodulating the pilot channel; and a traffic channel demodulating portion provided for each the traffic channel for demodulating the traffic channel, wherein the pilot channel demodulating portion comprises:

a matched filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel; and phase error estimating/averaging means for estimating received phases of individual received pilot symbols of a received pilot signal included in the despread signal of the pilot channel by comparing the received pilot signal with the pilot signal of a known pattern of the pilot channel, and for obtaining differences between the received pilot symbols and an average signal obtained by averaging the received phases of the received pilot symbols, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises decision means for deciding information symbols whose phases have been compensated, and the traffic channel tap coefficient control means calculates the tap coefficients that will minimize a mean square error of difference between the information symbols whose phases have been compensated and information symbols outputted from the decision means.

In a fourth aspect of the present invention, there is provided a CDMA (Code Division Multiple Access) demodulator used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, the CDMA demodulator, which demodulates the spread signals transmitted through multipaths by using the spreading codes, comprising for each path:

an orthogonal filter including a plurality of delay elements, a plurality of multipliers and an adder, the delay elements providing the spread signal with successive delays each of an amount of 1/m of a chip interval of the spreading code, where m is a positive integer, the multipliers multiplying the spread signal and successively delayed spread signals by tap coefficients obtained on the basis of the spreading code, and the adder summing up outputs of the multipliers, the orthogonal filter despreading the spread signal to generate a despread signal;

absolute phase estimating means for estimating received phases of a received pilot signal by comparing the received pilot signal included in the despread signal with the pilot signal of a known pattern, and for estimating a received phase of each information symbol in the information signal by interpolating the received phases of the received pilot signal;

phase error compensation means for compensating received phase errors of the received pilot signal on the basis of estimated received phases of the received pilot signal, and for compensating a phase error of each information symbol on the basis of an estimated received phase of the information symbol; and tap coefficient control means for calculating the tap coefficients, and for feeding them to the orthogonal filter, wherein the demodulator further comprises:

a RAKE combiner for RAKE combining the pilot signals and the information symbols whose phases have been compensated, by multiplying for each path of the multipaths the pilot signal and the information symbols by weighting factors; and decision means for deciding a RAKE combined signal, and wherein the tap coefficient control means of each path calculates the tap coefficients that will minimize mean square error of difference between an output of the phase error compensation means of each path and signals obtained by sharing in terms of power an output of the decision means in accordance with the weighting factors of the RAKE combiner.

The weighting factors may be received SIRs (Signal-to-Interference Ratios) of individual paths of the multipaths.

In a fifth aspect of the present invention, there is provided a CDMA (Code Division Multiple Access) demodulator of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in multiple access transmission, the CDMA demodulator, which demodulates the spread signals transmitted through multipaths by using the spreading codes, comprising for each path of the multipaths:

a pilot channel demodulating portion for demodulating the pilot channel; and a traffic channel demodulating portion provided for each traffic channel for demodulating the traffic channel, wherein the pilot channel demodulating portion comprises:

a pilot channel orthogonal filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel;

phase error estimating/averaging means for estimating received phases of individual received pilot symbols of a received pilot signal included in the despread signal of the pilot channel by comparing the received pilot signal with the pilot signal of a known pattern of the pilot channel, and for obtaining phase differences between the received pilot symbols and an average signal obtained by averaging the received phases of the received pilot symbols; and pilot channel tap coefficient control means for calculating the tap coefficients of the pilot channel, which will minimize a mean square error of the phase difference between the received pilot symbols and the average signal, and for feeding the tap coefficients to the pilot channel orthogonal filter, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises:

a RAKE combiner for RAKE combining the information symbols whose phases have been compensated, by multiplying for each path of the multipaths the information symbols by weighting factors; and decision means for deciding a RAKE combined signal, and wherein the traffic channel tap coefficient control means of each path calculates the tap coefficients that will minimize mean square error of difference between an output of the traffic channel phase error compensation means of each path and one of signals obtained by sharing in terms of power an output of the decision means in accordance with the weighting factors of the RAKE combiner.

In a sixth aspect of the present invention, there is provided a CDMA (Code Division Multiple Access) demodulator of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in multiple access transmission, the CDMA demodulator, which demodulates the spread signals transmitted through multipaths by using the spreading codes, comprising for each path of the multipaths:

a pilot channel demodulating portion for demodulating the pilot channel; and a traffic channel demodulating portion provided for each traffic channel for demodulating the traffic channel, wherein the pilot channel demodulating portion comprises:

a pilot channel matched filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel matched filter despreading the spread signal of the pilot channel to generate a despread signal of the pilot channel; and phase error estimating/averaging means for estimating received phases of individually received pilot symbols of a received pilot signal included in the despread signal of the pilot channel by comparing the received pilot signal with the pilot signal of a known pattern of the pilot channel, and for obtaining differences between the received pilot symbols and an average signal obtained by averaging the received phases of the received pilot symbols, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises:

a RAKE combiner for RAKE combining the information symbols whose phases have been compensated, by multiplying for each path of the multipaths the information symbols by weighting factors; and decision means for deciding a RAKE combined signal, and wherein the traffic channel tap coefficient control means of each path calculates the tap coefficients that will minimize mean square error of difference between an output of the traffic channel phase error compensation means of each path and one of signals obtained by sharing in terms of power an output of the decision means in accordance with the weighting factors of the RAKE combiner.

In a seventh aspect of the present invention, there is provided a CDMA (Code Division Multiple Access) transmission system carrying out communications between a base station and mobile stations in multiple access transmission by using spread signals generated by spreading information signals into wideband signals using spreading codes whose rate is higher than a transmission rate of the information signals, the CDMA transmission system including forward link channels from the base station to the mobile stations, each of the forward link channels comprising:

at least one pilot channel for transmitting only a pilot signal of a known pattern; and a plurality of traffic channels for transmitting the information signals.

The spreading codes may comprise an interval identical to an interval of an information symbol of the information signals.

A demodulator of a receiver of the mobile stations may comprise:

a pilot channel demodulating portion for demodulating the pilot channel; and a traffic channel demodulating portion provided for each traffic channel for demodulating the traffic channel, wherein the pilot channel demodulating portion comprises:

a pilot channel orthogonal filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel;

phase error estimating/averaging means for estimating received phases of individual received pilot symbols of a received pilot signal included in the despread signal of the pilot channel by comparing the received pilot signal with the pilot signal of a known pattern of the pilot channel, and for obtaining phase differences between the received pilot symbols and an average signal obtained by averaging the received phases of the received pilot symbols; and pilot channel tap coefficient control means for calculating the tap coefficients of the pilot channel, which will minimize a mean square error of the phase difference between the received pilot symbols and the average signal, and for feeding the tap coefficients to the pilot channel orthogonal filter, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises decision means for deciding information symbols whose phases have been compensated, and the traffic channel tap coefficient control means calculates the tap coefficients that will minimize a mean square error of difference between the information symbols whose phases have been compensated and information symbols outputted from the decision means.

A demodulator of a receiver of the mobile stations may comprise:

a pilot channel demodulating portion for demodulating the pilot channel; and a traffic channel demodulating portion provided for each traffic channel for demodulating the traffic channel, wherein the pilot channel demodulating portion comprises:

a matched filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel; and phase error estimating/averaging means for estimating received phases of individually received pilot symbols of a received pilot signal included in the despread signal of the pilot channel by comparing the received pilot signal with the pilot signal of a known pattern of the pilot channel, and for obtaining differences between the received pilot symbols and an average signal obtained by averaging the received phases of the received pilot symbols, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding to the information symbol; and traffic channel tap coefficient control means for calculating tap coefficients of the traffic channel, and for feeding the tap coefficients to the traffic channel orthogonal filter, and wherein the demodulator further comprises decision means for deciding information symbols whose phases have been compensated; and the traffic channel tap coefficient control means calculates the tap coefficients that will minimize a mean square error of difference between the information symbols whose phases have been compensated and information symbols outputted from the decision means.

A demodulator of a receiver of the mobile stations may comprise for each path of the multipaths:

a pilot channel demodulating portion for demodulating the pilot channel; and a traffic channel demodulating portion provided for each traffic channel for demodulating the traffic channel, wherein the pilot channel demodulating portion comprises:

a pilot channel orthogonal filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel orthogonal filter despreading the spread signal of the pilot channel to generate a despread signal of the pilot channel;

phase error estimating/averaging means for estimating received phases of individual received pilot symbols of a received pilot signal included in the despread signal of the pilot channel by comparing the received pilot signal with the pilot signal of a known pattern of the pilot channel, and for obtaining phase differences between the received pilot symbols and an average signal obtained by averaging the received phases of the received pilot symbols; and pilot channel tap coefficient control means for calculating the tap coefficients of the pilot channel, which will minimize a mean square error of the phase differences between the received pilot symbols and the average signal, and for feeding the tap coefficients to the pilot channel orthogonal filter, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding the information symbol; and traffic channel tap coefficient control means for calculating tap coefficients of the traffic channel, and for feeding the tap coefficients to the traffic channel orthogonal filter, and wherein the demodulator further comprises:

a RAKE combiner for RAKE combining the pilot signal and the information symbols whose phases have been compensated, by multiplying for each path of the multipaths the pilot signal and the information symbols by weighting factors; and decision means for deciding a RAKE combined signal, and wherein the traffic channel tap coefficient control means of the each path calculates the tap coefficients that will minimize mean square error of differences between an output of the traffic channel phase error compensation means of the each path and one of signals obtained by sharing in terms of power an output of the decision means in accordance with the weighting factors of the RAKE combiner.

A demodulator of a receiver of the mobile stations may comprise for each path of the multipaths:

a pilot channel demodulating portion for demodulating the pilot channel; and a traffic channel demodulating portion provided for each the traffic channel for demodulating the traffic channel, wherein the pilot channel demodulating portion comprises:

a pilot channel matched filter including a plurality of delay elements, a plurality of multipliers and an adder, the delay elements providing the spread signal of the pilot channel with successive delays each of an amount of 1/m of a chip interval of the spreading codes, where m is a positive integer, the multipliers multiplying the spread signal and successively delayed spread signals of the pilot channel by tap coefficients of the pilot channel obtained on the basis of the spreading code of the pilot channel, and the adder summing up outputs of the multipliers, the pilot channel matched filter despreading the spread signal of the pilot channel to generate a despread signal of the pilot channel; and phase error estimating/averaging means for estimating received phases of individual received pilot symbols of a received pilot signal included in the despread signal of the pilot channel by comparing the received pilot signal with the pilot signal of a known pattern of the pilot channel, and for obtaining differences between the received pilot symbols and an average signal obtained by averaging the received phases of the received pilot symbols, wherein the traffic channel demodulating portion comprises:

a traffic channel orthogonal filter including a plurality of delay elements, a plurality of multipliers and an adder, the delay elements providing the spread signal of the traffic channel with successive delays each of an amount of 1/m of a chip interval of the spreading codes, where m is a positive integer, the multipliers multiplying the spread signal and successively delayed spread signals of the traffic channel by tap coefficients of the traffic channel obtained on the basis of the spreading code of the traffic channel, and the adder summing up outputs of the multipliers, the traffic channel orthogonal filter despreading the spread signal of the traffic channel to generate a despread signal of the traffic channel;

traffic channel phase error compensation means for compensating a received phase of each information symbol in the information signal included in the despread signal of the traffic channel on the basis of the received phase of the pilot symbol corresponding the information symbol; and traffic channel tap coefficient control means for calculating tap coefficients of the traffic channel, and for feeding the tap coefficients to the traffic channel orthogonal filter, and wherein the demodulator further comprises:

a RAKE combiner for RAKE combining the pilot signal and the information symbols whose phases have been compensated, by multiplying for each path of the multipaths the pilot signal and the information symbols by weighting factors; and decision means for deciding a RAKE combined signal, and wherein the traffic channel tap coefficient control means of each path calculates the tap coefficients that will minimize mean square error of differences between an output of the traffic channel phase error compensation means of each path and one of signals obtained by sharing in terms of power an output of the decision means in accordance with the weighting factors of the RAKE combiner.

In an eighth aspect of the present invention, there is provided a CDMA (Code Division Multiple Access) demodulation method used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, the CDMA demodulation method, which demodulates the spread signal by using the spreading code, comprising:

a step of outputting a despread signal by providing the spread signal with successive delays each of an amount of 1/m of a chip interval of the spreading code, where m is a positive integer, by multiplying the spread signal and successively delayed spread signals by tap coefficients obtained on the basis of the spreading code, and by summing up results of multiplications to despread the spread signal;

an absolute phase estimating step of estimating received phases of a received pilot signal by comparing the received pilot signal included in the despread signal with the pilot signal of a known pattern, and of estimating a received phase of each information symbol in the information signal by interpolating the received phases of the received pilot signal;

a phase error compensation step of compensating received phase errors of the received pilot signal on the basis of estimated received phases of the received pilot signal, and of compensating a phase error of each information symbol on the basis of an estimated received phase of the information symbol;

a decision step of deciding the pilot signal whose phase has been compensated, and of deciding the information symbol whose phase has been compensated; and a tap coefficient calculation step of calculating the tap coefficients which will minimize a mean square error of differences between an output of the phase error compensation step and an output of the decision step.

The tap coefficient calculation step may calculate the tap coefficients that will minimize the mean square error for each symbol in the pilot signal, and may calculate the tap coefficients that will minimize the mean square error for each symbol in the information signal.

The tap coefficient calculation step may calculate the tap coefficients that will minimize the mean square error for each pilot signal.

The tap coefficient calculation step may calculate the tap coefficients that will minimize the mean square error for each pilot signal, and may calculate the tap coefficients that will minimize the mean square error for each symbol in the information signal.

In a ninth aspect of the present invention, there is provided a CDMA (Code Division Multiple Access) demodulation method of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in a multiple access transmission, the CDMA demodulation method comprising:

a step of outputting a despread signal of the pilot signal by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining phase differences between the received pilot symbols and an average signal obtained by averaging the received phases of the received pilot symbols;

a step of calculating the tap coefficients of the pilot channel, which will minimize a mean square error of the phase differences between the received pilot symbols and the average signal;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each the information symbol in the information signal included in the despread signal of the traffic channel on the basis of the received phase of the pilot symbol corresponding the information symbol;

a decision step of deciding information symbols whose phases have been compensated; and a step of calculating the tap coefficients that will minimize a mean square error of differences between the information symbols whose phases have been compensated and information symbols which have been decided.

In a tenth aspect of the present invention, there is provided a CDMA (Code Division Multiple Access) demodulation method of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in a multiple access transmission, the CDMA demodulation method comprising:

a step of outputting a despread signal of the pilot signal by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining differences between the received pilot symbols and an average signal obtained by averaging the received phases of the received pilot symbols;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each information symbol in the information signal included in the despread signal of the traffic channel on the basis of the received phase of the pilot symbol corresponding the information symbol;

a step of deciding information symbols whose phases have been compensated; and a step of calculating the tap coefficients that will minimize a mean square error of differences between the information symbols whose phases have been compensated and information symbols which have been decided.

In an eleventh aspect of the present invention, there is provided a CDMA (Code Division Multiple Access) demodulation method used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, the CDMA demodulation method, which demodulates the spread signals transmitted through multipaths by using the spreading codes, comprising for each path:

a step of outputting a despread signal by providing the spread signal with successive delays each of an amount of 1/m of a chip interval of the spreading code, where m is a positive integer, by multiplying the spread signal and successively delayed spread signals by tap coefficients obtained on the basis of the spreading code, and by summing up results of multiplications to despread the spread signal;

an absolute phase estimating step of estimating received phases of a received pilot signal by comparing the received pilot signal included in the despread signal with the pilot signal of a known pattern, and of estimating a received phase of each information symbol in the information signal by interpolating the received phases of the received pilot signal;

a phase error compensation step of compensating received phase errors of the received pilot signal on the basis of estimated received phases of the received pilot signal, and of compensating a phase error of each information symbol on the basis of an estimated received phase of the information symbol;

a RAKE combining step of RAKE combining the pilot signals and the information symbols whose phases have been compensated, by multiplying for each path of the multipaths the pilot signal and the information symbols by weighting factors;

a decision step of deciding a RAKE combined signal; and a step of calculating the tap coefficients that will minimize mean square error of differences between an output of the phase error compensation step of the each path and signals obtained by sharing in terms of power an output of the decision step in accordance with the weighting factors of the RAKE combining.

The weighting factors may be received SIRs (Signal-to-Interference Ratios) of individual paths of the multipaths.

In a twelfth aspect of the present invention, there is provided a CDMA (Code Division Multiple Access) demodulation method of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in multiple access transmission, the CDMA demodulation method, which demodulates the spread signals transmitted through multipaths by using the spreading codes, comprising for each path of the multipaths:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining phase differences between the received pilot symbols and an average signal obtained by averaging the received phases of the received pilot symbols;

a step of calculating the tap coefficients of the pilot channel, which will minimize a mean square error of the phase differences between the received pilot symbols and the average signal;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each the information symbol in the information signal included in the despread signal of the traffic channel on the basis of the received phase of the pilot symbol corresponding the information symbol;

a RAKE combining step of RAKE combining the information symbols whose phases have been compensated, by multiplying for each path of the multipaths the information symbols by weighting factors;

a decision step of deciding a RAKE combined signal; and a step of calculating the tap coefficients that will minimize mean square error of differences between an output of the traffic channel phase error compensation step of each path and one of signals obtained by sharing in terms of power an output of the decision step in accordance with the weighting factors of the RAKE combining.

In a thirteenth aspect of the present invention, there is provided a CDMA (Code Division Multiple Access) demodulation method of a receiver of a mobile station used in a CDMA transmission system whose forward link channels from a base station to mobile stations include at least one pilot channel and multiple traffic channels, the pilot channel transmitting only a pilot signal of a known pattern, and the traffic channels transmitting information signals, the CDMA transmission system spreading the pilot signal and the information signals into wideband signals by using spreading codes faster than a transmission rate of the pilot signal and the information signals, thereby generating spread signals to perform communications between the base station and the mobile stations in multiple access transmission, the CDMA demodulation method, which demodulates the spread signals transmitted through multipaths by using the spreading codes, comprising for each path of the multipaths:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining differences between the received pilot symbols and an average signal obtained by averaging the received phases of the received pilot symbols;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each the information symbol in the information signal included in the despread signal of the traffic channel on the basis of the received phase of the pilot symbol corresponding the information symbol;

a RAKE combining step of RAKE combining the information symbols whose phases have been compensated, by multiplying for each path of the multipaths the information symbols by weighting factors;

a decision step of deciding a RAKE combined signal; and a step of calculating the tap coefficients that will minimize mean square error of differences between an output of the traffic channel phase error compensation step of the each path and one of signals obtained by sharing in terms of power an output of the decision step in accordance with the weighting factors of the RAKE combining.

In a fourteenth aspect of the present invention, there is provided a CDMA (Code Division Multiple Access) transmission method carrying out communications between a base station and mobile stations in multiple access transmission by using spread signals generated by spreading information signals into wideband signals using spreading codes whose rate is higher than a transmission rate of the information signals, the CDMA method comprising:

a step of transmitting from the base station to the mobile stations only a pilot signal of a known pattern through at least one pilot channel; and a step of transmitting the information signals through a plurality of traffic channels.

The spreading codes may comprise an interval identical to an interval of an information symbol of the information signals.

A demodulation method of a receiver of the mobile stations may comprise:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining phase differences between the received pilot symbols and an average signal obtained by averaging the received phases of the received pilot symbols;

a pilot channel tap coefficient calculation step of calculating the tap coefficients of the pilot channel, which will minimize a mean square error of the phase differences between the received pilot symbols and the average signal;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each information symbol in the information signal included in the despread signal of the traffic channel on the basis of the received phase of the pilot symbol corresponding the information symbol;

a decision step of deciding information symbols whose phases have been compensated; and a step of calculating the tap coefficients that will minimize a mean square error of differences between the information symbols whose phases have been compensated and information symbols which have been decided.

A demodulation method of a receiver of the mobile stations may comprise:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining differences between the received pilot symbols and an average signal obtained by averaging the received phases of the received pilot symbols;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplication to despread the spread signal of the traffic channel;

a traffic channel phase error compensation step of compensating a received phase of each the information symbol in the information signal included in the despread signal of the traffic channel on the basis of the received phase of the pilot symbol corresponding the information symbol;

a decision step of deciding information symbols whose phases have been compensated; and a step of calculating the tap coefficients that will minimize a mean square error of differences between the information symbols whose phases have been compensated and information symbols which have been decided.

A demodulation method of a receiver of the mobile stations may comprise for each path of the multipaths:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining phase differences between the received pilot symbols and an average signal obtained by averaging the received phases of the received pilot symbols;

a step of calculating the tap coefficients of the pilot channel, which will minimize a mean square error of the phase differences between the received pilot symbols and the average signal;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each information symbol in the information signal included in the despread signal of the traffic channel on the basis of the received phase of the pilot symbol corresponding the information symbol;

a RAKE combining step of RAKE combining the pilot signal and the information symbols whose phases have been compensated, by multiplying for each path of the multipaths the pilot signal and the information symbols by weighting factors;

a decision step of deciding a RAKE combined signal; and a step of calculating the tap coefficients that will minimize mean square error of differences between an output of the traffic channel phase error compensation step of the each path and one of signals obtained by sharing in terms of power an output of the decision step in accordance with the weighting factors of the RAKE combining.

A demodulation method of a receiver of the mobile stations may comprise for each path of the multipaths:

a step of outputting a despread signal of the pilot channel by providing the spread signal of the pilot channel with successive delays each of an amount of 1/m of a chip interval of the spreading codes, where m is a positive integer, by multiplying the spread signal and successively delayed spread signals of the pilot channel by tap coefficients of the pilot channel obtained on the basis of the spreading code of the pilot channel, and by summing up results of multiplications to despread the spread signal of the pilot channel;

a phase error estimating/averaging step of estimating received phases of individual received pilot symbols of a received pilot signal included in the despread signal of the pilot channel by comparing the received pilot signal with the pilot signal of a known pattern of the pilot channel, and of obtaining differences between the received pilot symbols and an average signal obtained by averaging the received phases of the received pilot symbols;

a step of outputting a despread signal of the traffic channel by providing the spread signal of the traffic channel with successive delays each of an amount of 1/m of a chip interval of the spreading codes, where m is a positive integer, by multiplying the spread signal and successively delayed spread signals of the traffic channel by tap coefficients of the traffic channel obtained on the basis of the spreading code of the traffic channel, and by summing up results of multiplications to despread the spread signal of the traffic channel;

a traffic channel phase error compensation step of compensating a received phase of each information symbol in the information signal included in the despread signal of the traffic channel on the basis of the received phase of the pilot symbol corresponding the information symbol;

a RAKE combining step of RAKE combining the pilot signal and the information symbols whose phases have been compensated, by multiplying for each path of the multipaths the pilot signal and the information symbols by weighting factors;

a decision step of deciding a RAKE combined signal; and a step of calculating the tap coefficients that will minimize mean square error of differences between an output of the traffic channel phase error compensation step of each path and one of signals obtained by sharing in terms of power an output of the decision step in accordance with the weighting factors of the RAKE combining.

BRIEF DESCRIPTION OF THE DRAWINGS

FIGS. 8A and 8B are flowcharts illustrating a first method for obtaining tap coefficients of an orthogonal filter;

FIGS. 10A and 10B are flowcharts illustrating a third method for obtaining the tap coefficients of the orthogonal filter;

BEST MODE FOR CARRYING OUT THE INVENTION

The invention will now be described with reference to the accompanying drawings.

EMBODIMENT 1

Figure 1:
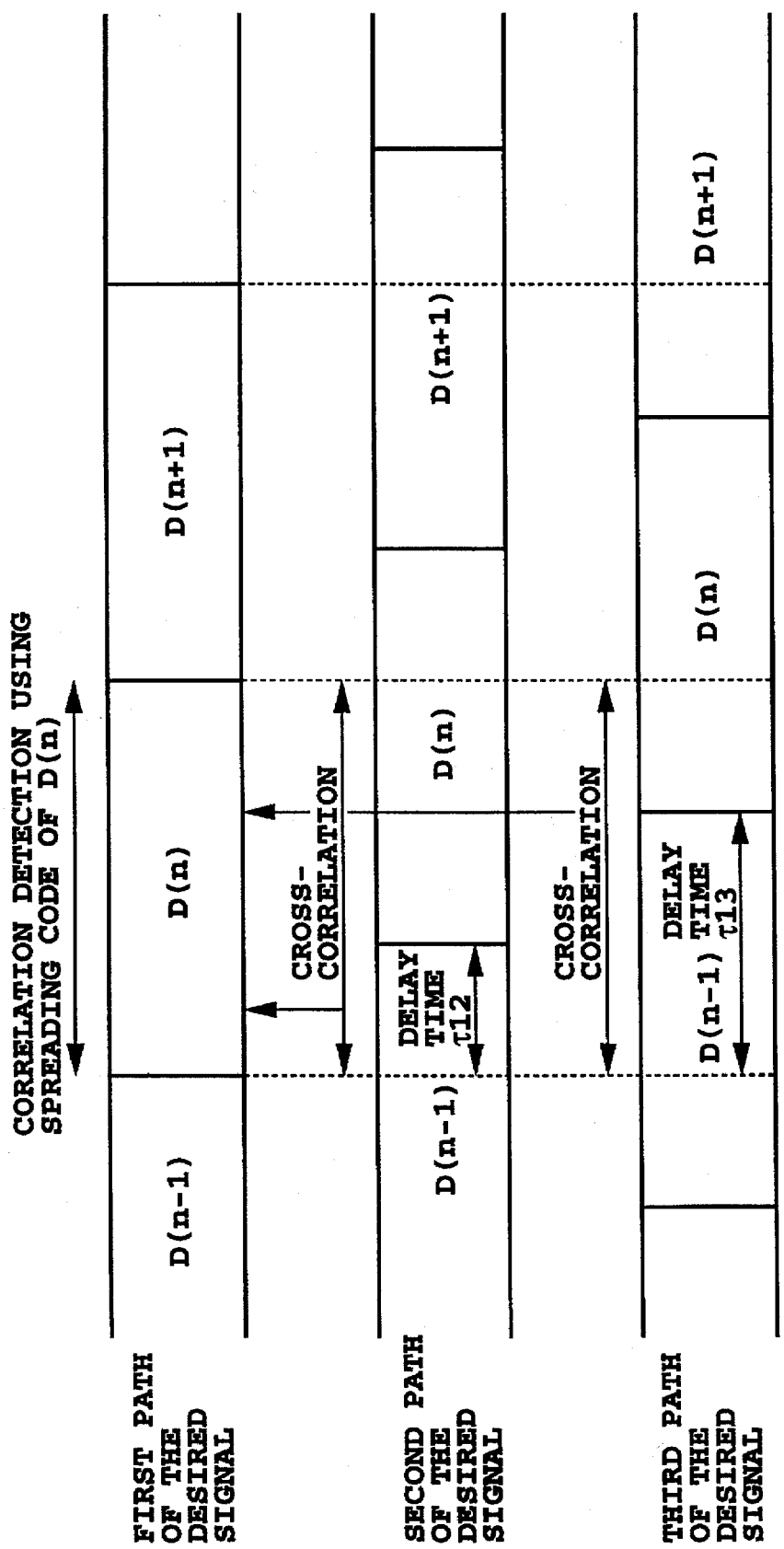
FIG. 1 is a diagram illustrating the interferences between multipaths in a forward link channel.
Figure 2:
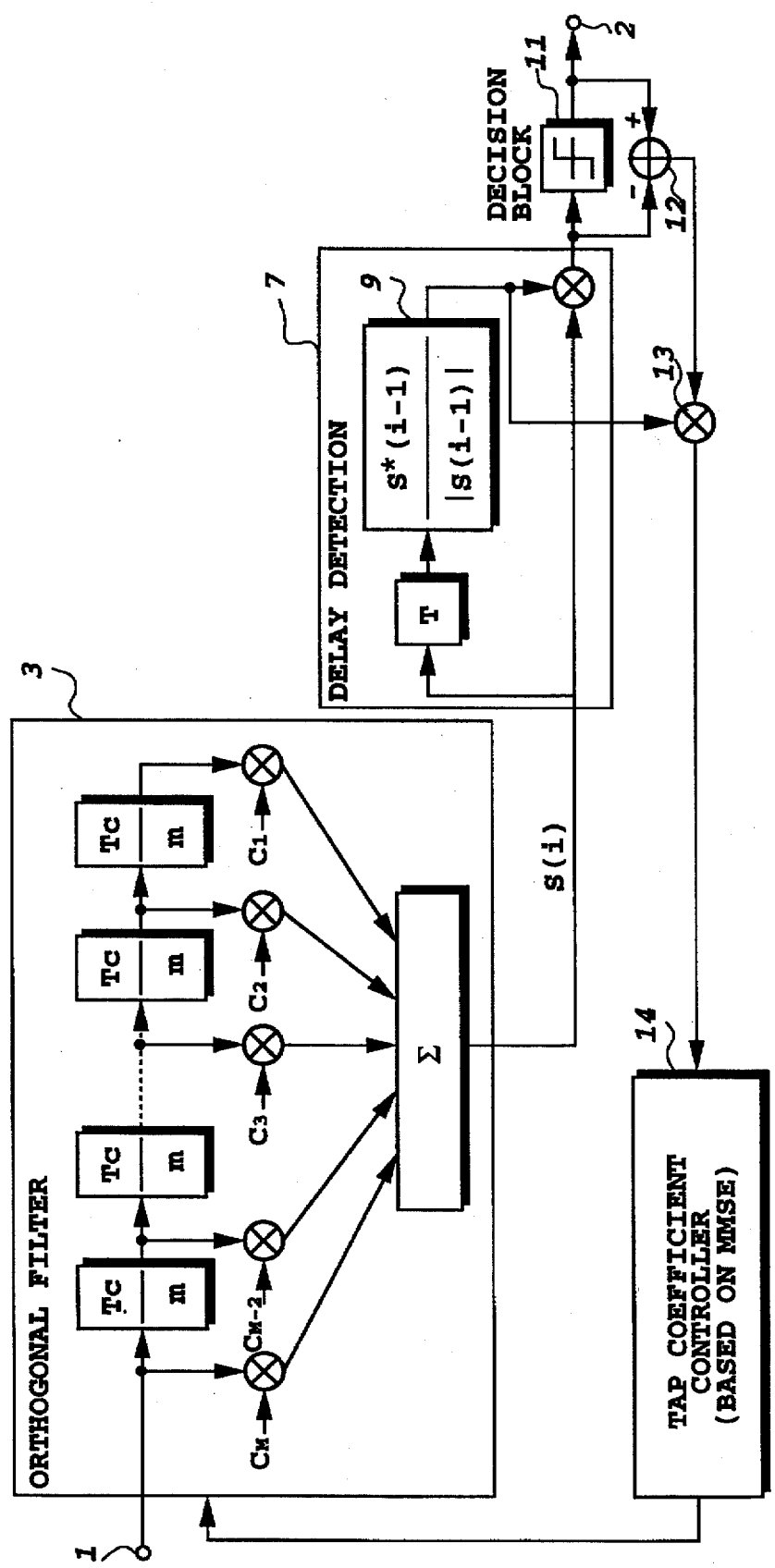
FIG. 2 is a block diagram showing a conventional demodulator.
Figure 3:
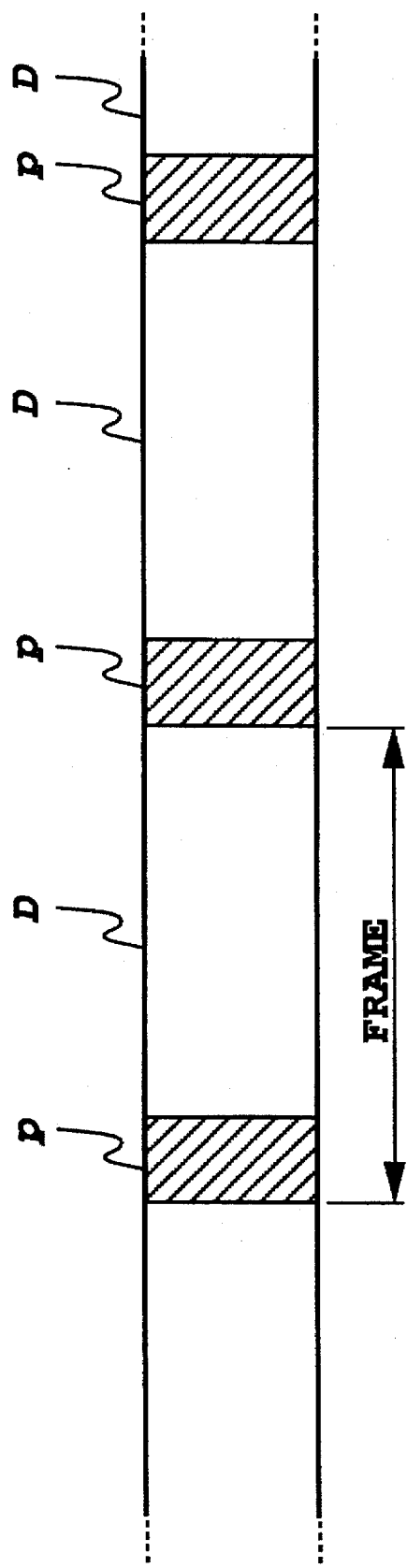
FIG. 3 is schematic diagram illustrating a format of a signal used in an interpolation coherent detection.
Figure 4:
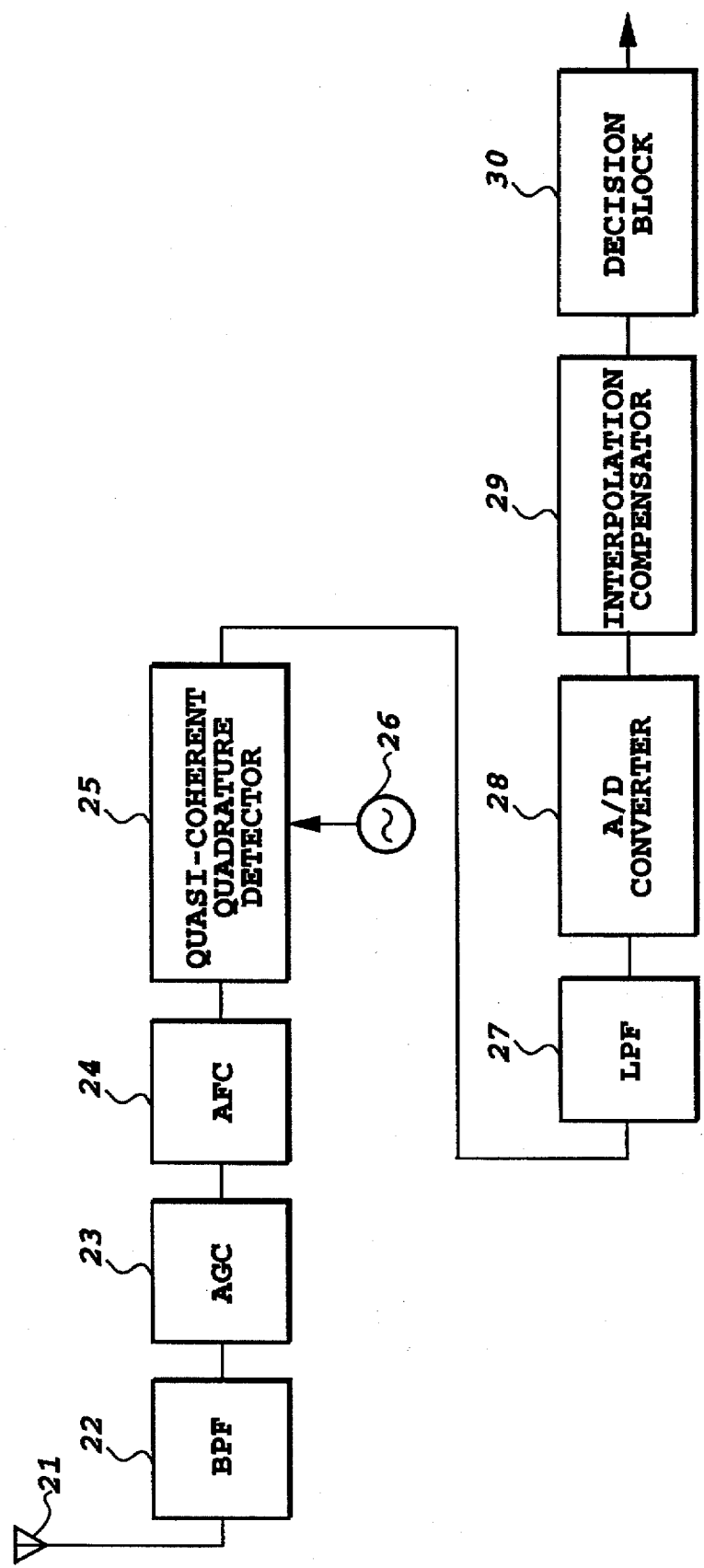
FIG. 4 is a block diagram showing a configuration up to the detection stage of a conventional receiver employing the interpolation coherent detection.
Figure 5:
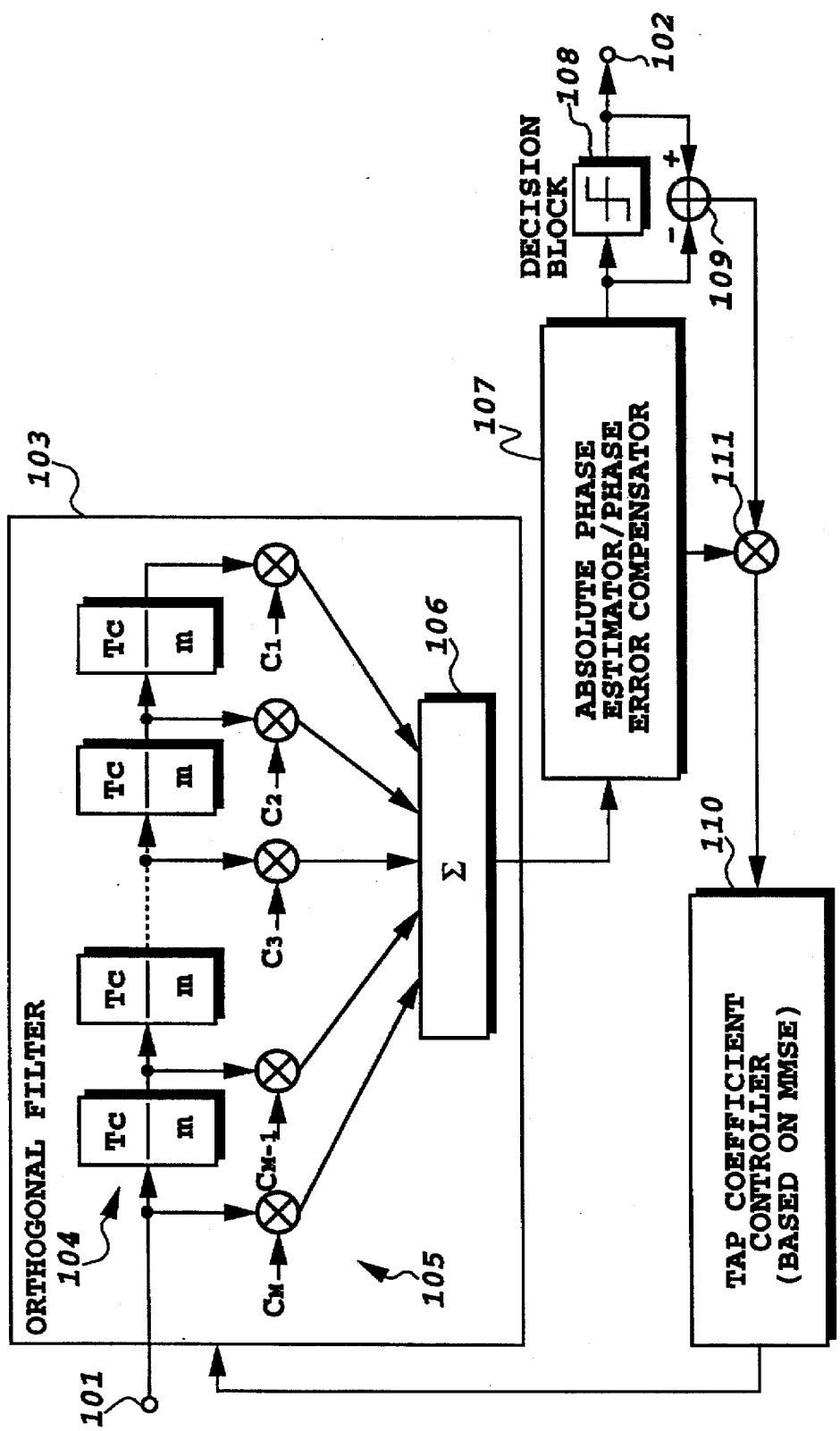
FIG. 5 is a block diagram showing a first embodiment of a CDMA demodulator in accordance with the present invention.

FIG. 5 is a block diagram showing a first embodiment of a demodulator in accordance with the present invention. The demodulator is connected to the output terminal of the AFC 24 of the receiver shown in FIG. 4, and is provided with a received spread signal therefrom. In the following, respective signals and tap coefficients are handled as a vector having an in-phase component and a quadrature component. Accordingly, the term "tap coefficient" and "tap coefficient vector", for example, refer to an identical item.

In FIG. 5, a received spread signal is fed to an orthogonal filter 103 through an input terminal 101. The orthogonal filter 103 comprises a delay circuit 104, a tap coefficient multiplying circuit 105 and a tap signal adder 106. The delay circuit 104 includes M taps (M is an integer equal to or greater than one) drawn out every Tc/m delay interval, where Tc is a chip interval of a spreading code and m is an integer equal to or greater than one. The total delay time of the delay circuit 104 is a few (for example, five) symbol intervals. The output signals from the taps are fed to respective multipliers of the tap coefficient multiplying circuit 105, and are multiplied by tap coefficient vectors CM . . . , C1. The tap coefficients are determined on the basis of the spread code, and are adaptively controlled so that the received code of the intended channel is kept orthogonal to the spreading codes of the other users. The products outputted from the multipliers are summed up by the tap signal adder 106, and the sum is outputted as a narrowband despread signal. The despread signal is fed to an absolute phase estimator/phase error compensator 107.

Figure 6:
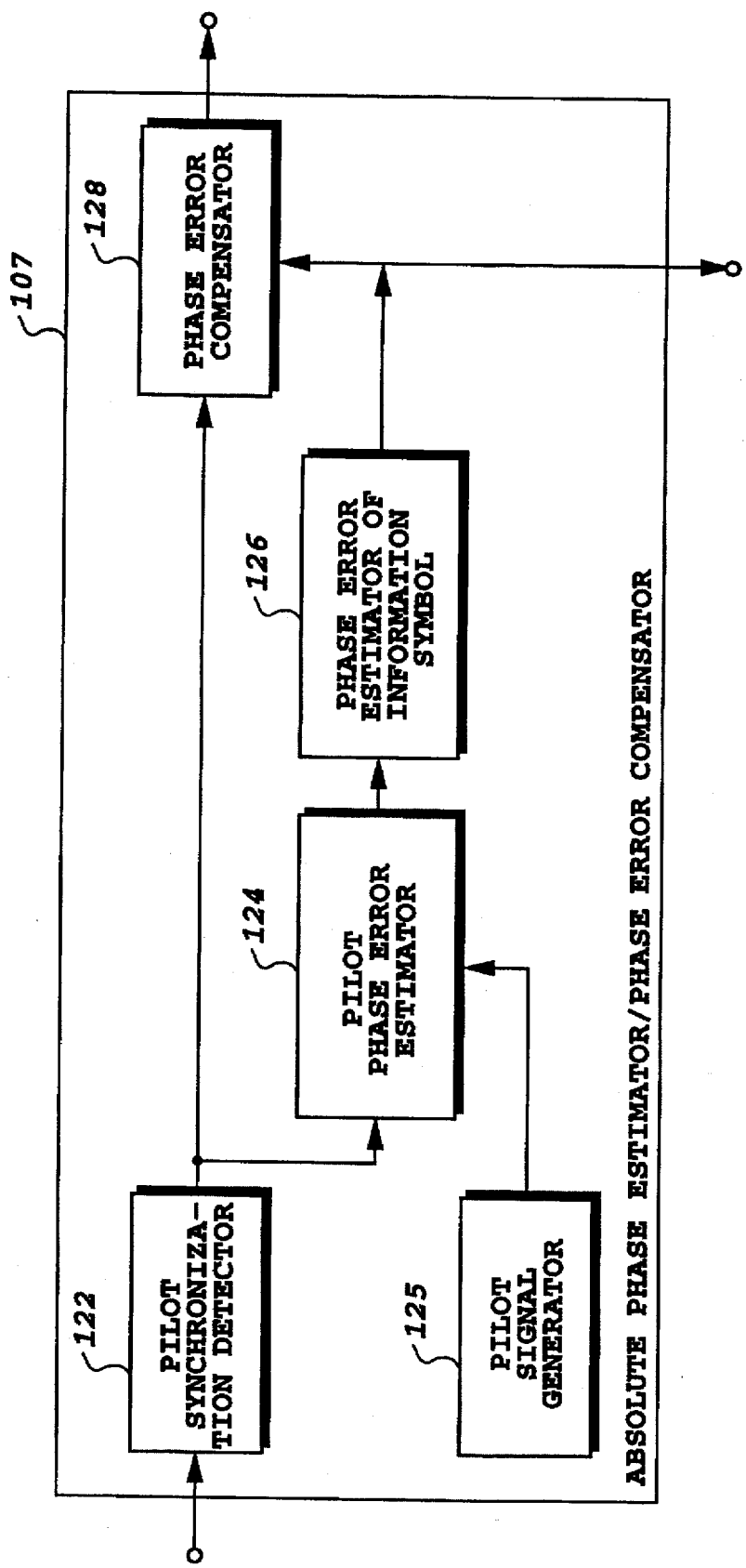
FIG. 6 is a block diagram showing a configuration of an absolute phase estimator/phase error compensator in the first embodiment.

FIG. 6 is a block diagram showing a configuration of the absolute phase estimator/phase error compensator 107.

The despread signal outputted from the orthogonal filter 103 of FIG. 5 is fed to a pilot synchronization detector 122 of FIG. 6. The pilot synchronization detector 122 recovers the clock timing of each symbol, and the frame timing which is the repetitive interval of the pilot signal, thereby generating a symbol synchronizing signal and a frame synchronizing signal. These synchronizing signals are fed to respective blocks within the absolute phase estimator/phase error compensator 107. The pilot synchronization detector 122 also supplies the despread signal to a pilot phase error estimator 124 and a phase error compensator 128.

The pilot phase error estimator 124 compares a reference pilot symbol of a known pattern supplied from a pilot signal generator 125 with a pilot symbol contained in the despread signal, and detects a phase deviation, that is, a phase error of the pilot symbol from the reference pilot symbol. Performing this processing each time a pilot symbol is received, the variation in the phase due to fluctuations in the propagation path can be estimated on the real time basis. The estimated phase error is averaged in a pilot signal section, and is fed to a phase error estimator of information symbol 126.

The phase error estimator of information symbol 126 interpolates the average phase error obtained in pilot signal sections, thereby estimating the phase error for each information symbol. Specifically, it estimates the phase error, at each information symbol timing, by interpolating the average phase errors obtained in successive pilot signal sections to an information signal section using a first-order interpolation or second-order interpolation. Thus, the phase error estimator of information symbol 126 generates one estimated phase error for each information symbol, and provides it to a phase error compensator 128. The phase error compensator 128 compensates each information symbol using the estimated phase error.

Figure 7:
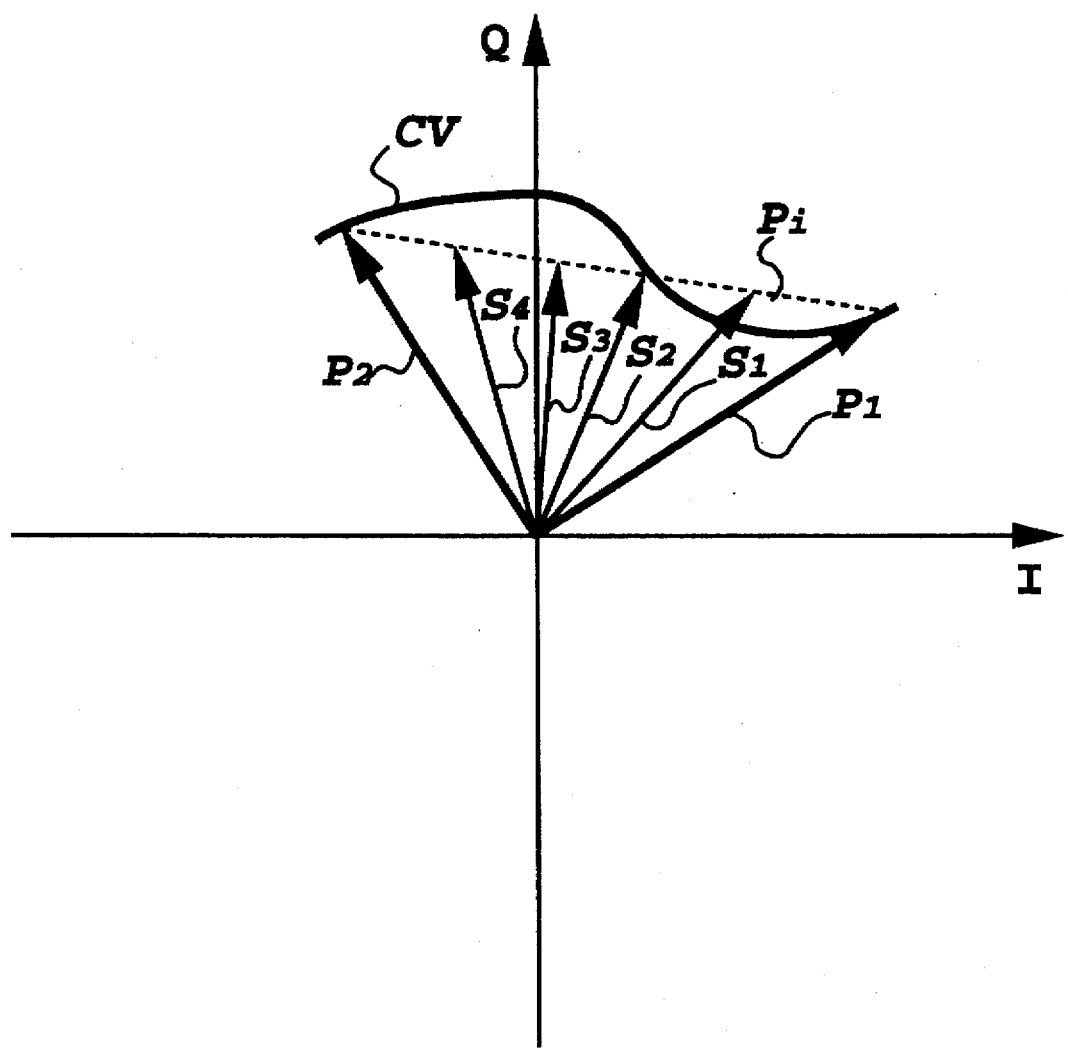
FIG. 7 is a diagram illustrating received phase error correction of information symbols based on phase errors detected by using a pilot signal.

FIG. 7 illustrates a method for compensating the phase errors of information symbols by the phase error compensator 128. Interpolation of average phase vectors P1 and P2 obtained in two successive pilot sectors provides a broken line Pi. From this broken line Pi and the positions of individual information symbols with respect to the pilot signals, phase vectors S1, S2, ... of the information symbols are obtained. In this figure, the curve CV indicates an example of a locus of end points of the actual phase vectors of the symbols. Although FIG. 7 illustrates the simplest first-order interpolation, second-order interpolation or Gaussian interpolation can also be used, which are described in the above-mentioned Sampei's paper.

The information symbols compensated by the absolute phase estimator/phase error compensator 107 are fed to a decision block 108 and an error vector calculator 109. The decision block 108 carries out the absolute coherent detection of the information symbols, and outputs the results from an output terminal 102 as a decoded output, and fed it to the error vector calculator 109.

The error vector calculator 109 obtains differences between the information symbols produced from the absolute phase estimator/phase error compensator 107 and the decoded output produced from the decision block 108, and fed them to a multiplier 111 as an error signal (error vectors). The multiplier 111 performs vector multiplication of the estimated phases calculated by the absolute phase estimator/phase error compensator 107 and the error signal. This is carried out for matching the phases of the input signal and the error signal. The output of the multiplier 111 is fed to a tap coefficient controller 110.

The tap coefficient controller 110 obtains the tap coefficient vectors CM, ..., C1 for the orthogonal filter 103 on the basis of the error vectors. Specifically, it obtains the tap coefficient vectors that will minimize the mean square error of the error vectors. This is referred to as a tap coefficient vector calculation based on MMSE (Minimum Mean-Square Error) in this specification. The tap coefficient vectors based on MMSE is fed to the orthogonal filter 103.

The demodulation circuit in accordance with the present invention differs in one aspect from the circuit disclosed in the foregoing Sampei's paper in that it obtains the tap coefficients based on the MMSE. In Sampei's method, the amplitude variations are also removed at the compensation stage. As a result, no interference components remain in the compensated signal, which makes it impossible to cancel the interference in the orthogonal filter based on the MMSE.

FIGS. 8A–10B are flowcharts illustrating methods for obtaining the tap coefficient vectors.

Figure 8B:
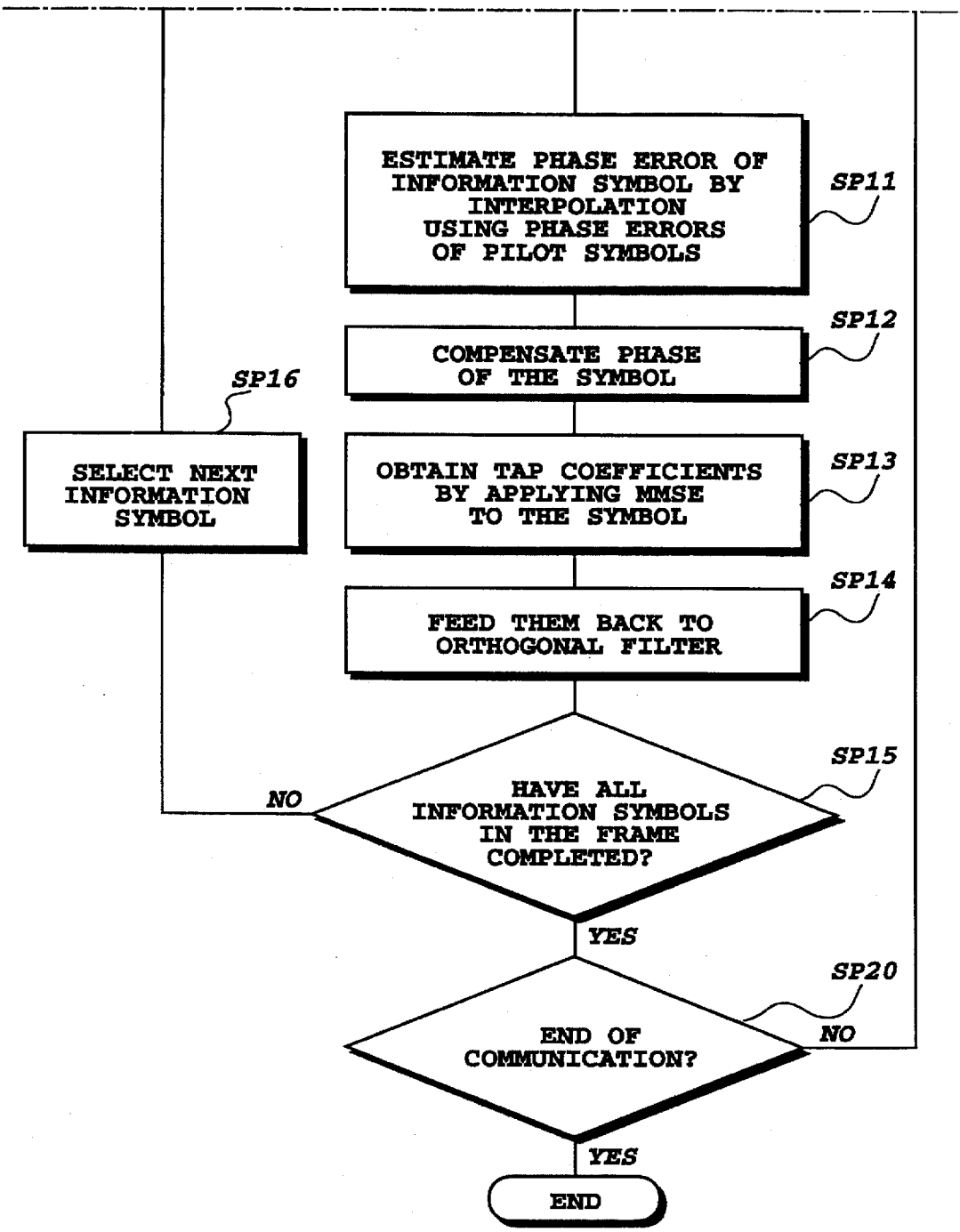

A first obtaining method illustrated in FIGS. 8A and 8B is a tap coefficient calculation method based on MMSE, in which an adaptive algorithm for averaging such as LMS (Least Mean Square) or RLS (Recursive Least Square) is applied to each symbol of the pilot signal and the information signal. This method has good tracking ability because it uses the entire information symbols in addition to the pilot symbols. The method will now be described with reference to FIGS. 8A and 8B.

At step SP1, the pilot phase error estimator 124 estimates the phase error of the first symbol in the pilot signal. At step SP2, the phase error compensator 128 compensates for the phase of the pilot symbol. At step SP3, the tap coefficient controller 110 calculates the tap coefficients by applying the MMSE to the pilot symbol, and feeds the calculated tap coefficients back to the orthogonal filter 103 at step SP4. At step SP5, the absolute phase estimator/phase error compensator 107 decides whether the entire symbols in the pilot signal section have been completed. If any symbol still remains, it selects the next symbol at step SP6, and returns to step SP1. Thus, the phase error estimation and phase compensation are carried out for the entire symbols in the pilot signal section.

After completing the phase error estimation and compensation for the pilot signal, the absolute phase estimator/phase error compensator 107 performs phase error estimation and compensation of each symbol in the information signal. At step SP11, the phase error estimator of information symbol 126 estimates the phase error of the first information symbol in the information signal. This is achieved by interpolating the average values of the phase errors obtained with the pilot symbols as shown in FIG. 7. At step SP12, the phase error compensator 128 compensates for the phase of the information symbol. At step SP13, the tap coefficient controller 110 obtains the tap coefficients by applying MMSE to the information symbol, and feeds the tap coefficients back to the orthogonal filter 103. At step SP15, the absolute phase estimator/phase error compensator 107 decides whether the entire information symbols in the frame have been completed. If any information symbols remain, it selects the next information symbol at step SP16 and returns to step SP11. Thus, the phase error estimation and the phase compensation is carried out for the entire symbols in the frame. The processing is continued until the end of the communication is detected at step SP20.

Figure 9:
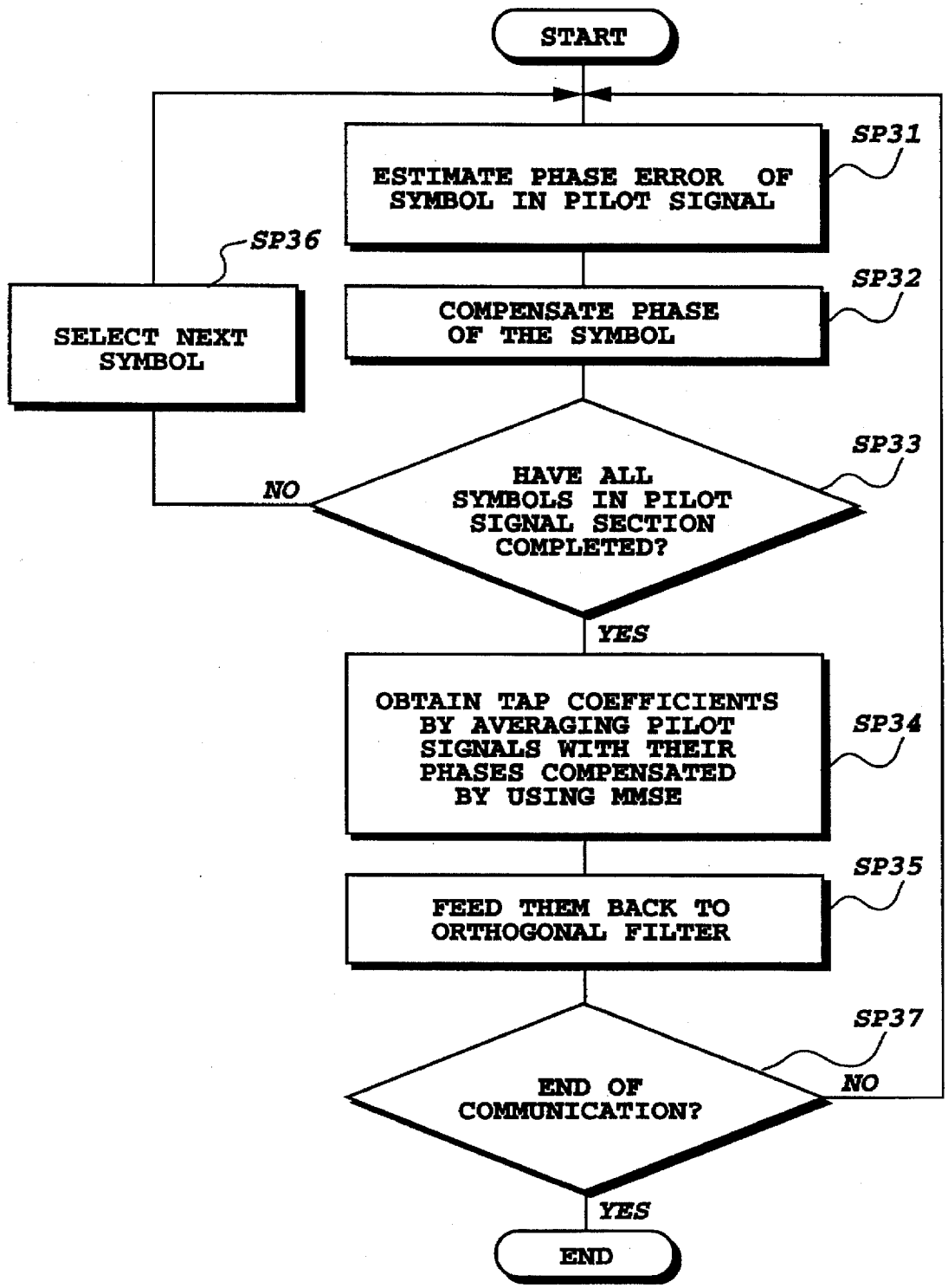
FIG. 9 is a flowchart illustrating a second method for obtaining the tap coefficients of the orthogonal filter.

A method illustrated in FIG. 9 obtains the tap coefficient vectors based on MMSE using only the pilot symbols. Since this method uses only the pilot symbols of a known pattern, it has poor tracking ability although its error is small. This method will now be described.

At step SP31, the pilot phase error estimator 124 estimates the phase error for the first symbol of the pilot signal. At step SP32, the phase error compensator 128 compensates for the phase of the pilot symbol. At step SP33, the absolute phase estimator/phase error compensator 107 decides whether the entire symbols in the pilot signal section have been completed. If any symbols still remain, it selects the next symbol at step SP36, and returns to step SP31.

If the phase error estimation and compensation of the entire symbols in the pilot signal section have been completed, the tap coefficient controller 110 averages the compensated pilot symbols and calculates the tap coefficients using MMSE at step SP34, and feeds them back to the orthogonal filter 103 at step SP35. This processing is continued until the end of the communication has been detected at step SP37.

Figure 10B:
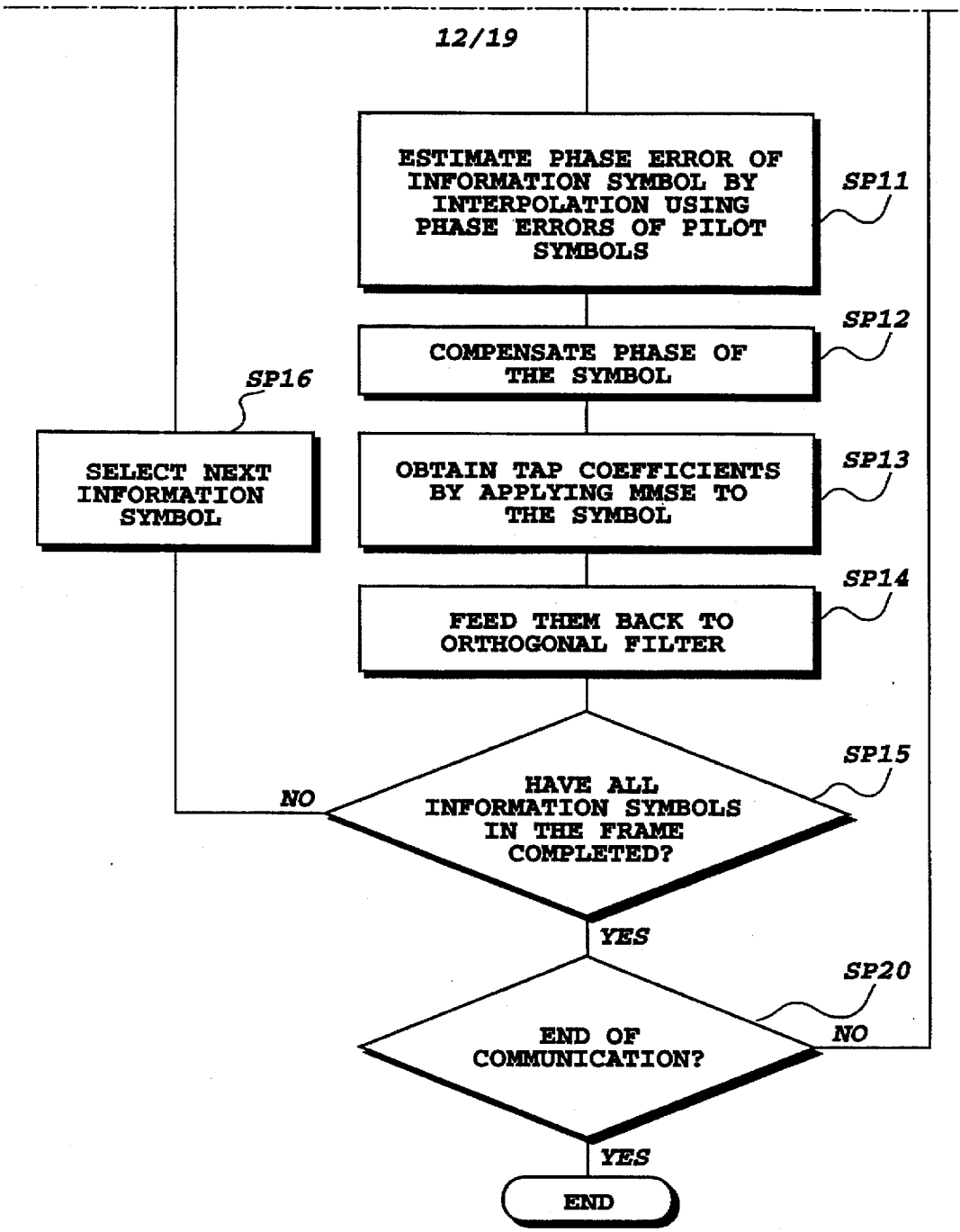

FIGS. 10A and 10B illustrate a method which obtains the tap coefficient vectors by using the pilot symbols in the pilot section, and calculates in the information section the tap coefficient vector for each information symbol by interpolating the tap coefficient vectors obtained by using the pilot symbols. Since it has better tracking ability than the method shown in FIG. 9, it is suitable for the changes in the assignment of the spreading codes in the cell due to paging or calling. Since the method is a combination of steps SP31–SP36 in FIG. 9 and steps SP11–SP20 in FIG. 8B as shown in FIGS. 10A and 10B, the description thereof is omitted here.

EMBODIMENT 2

Figure 11:
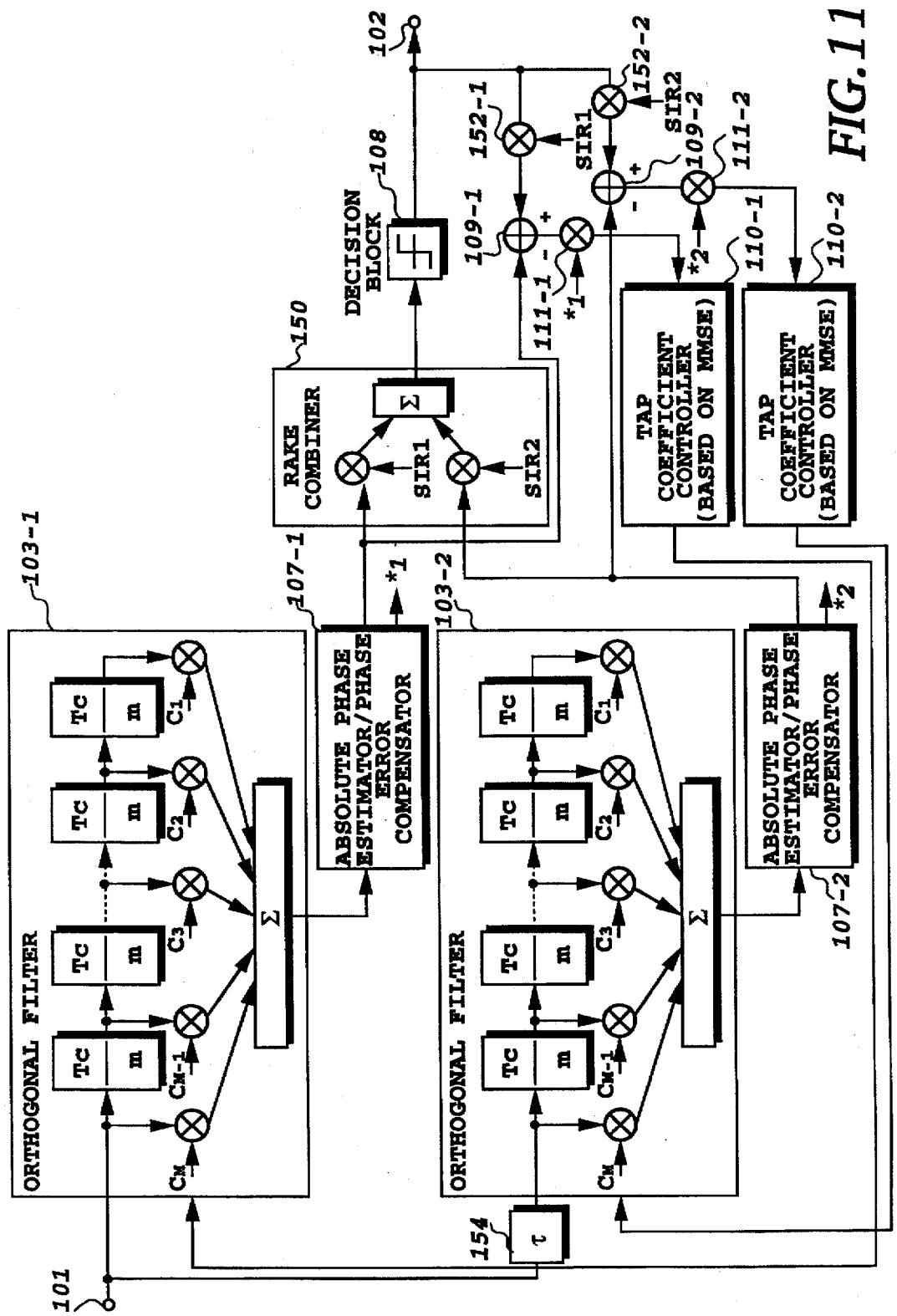
FIG. 11 is a block diagram showing a second embodiment of a CDMA demodulator in accordance with the present invention.

FIG. 11 is a block diagram showing a second embodiment of a demodulator in accordance with the present invention. This embodiment is used in the case where multipaths are present. Although FIG. 11 shows the simplest two paths case, three or more multipath system can also be implemented in a similar way by providing optimally controlled orthogonal filters for individual paths.

In FIG. 11, the received signal traveling through a first path is despread by an orthogonal filter 103-1, and undergoes phase compensation by an absolute phase estimator/phase error compensator 107-1 as in the first embodiment. Likewise, the received signal traveling through a second path is despread by an orthogonal filter 103-2, and undergoes phase compensation by an absolute phase estimator/phase error compensator 107-2.

A tap coefficient controller 110-1 of the first path calculates tap coefficient vectors for the orthogonal filter 103-1 from error vectors, and feeds them back to the orthogonal filter 103-1. In this case, the tap coefficient controller 110-1 considers the first path signal as a desired signal, and the second path signal as interference to the intended channel in calculating the tap coefficient vectors. Likewise, a tap coefficient controller 110-2 of the second path calculates tap coefficient vectors for the orthogonal filter 103-2 from error vectors, and feeds them back to the orthogonal filter 103-2. In this case, the tap coefficient controller 110-2 considers the second path signal as a desired signal, and the first path signal as interference to the intended channel in calculating the tap coefficient vectors. Thus, the tap coefficients are calculated for the orthogonal filter of each path. In this figure, the reference numeral 154 designates a delay of the second path signal with respect to the first path signal.

The signals outputted from the orthogonal filters 103-1 and 103-2 are fed to absolute phase estimator/phase error compensators 107-1 and 107-2, and undergo phase compensation, respectively. The two phase compensated signals are fed to a RAKE combiner 150.

The RAKE combiner 150 combines the two input signals. Specifically, it carries out in-phase weighted combining of the two signals to obtain a maximum ratio combination in accordance with SIRs (Signal-to-Interference Ratios) of respective paths. This combining method is a known technique. The combined signal is decided by the decision block 108.

The decision output signal is produced from the output terminal 102 as the decoded output. In addition, it is fed to multipliers 152-1 and 152-2, at which it is weighted by the SIRs. The weighted decision outputs are fed to error vector calculators 109-1 and 109-2. The error vector calculators 109-1 and 109-2 obtain the differences between the weighted decision outputs and the outputs from the absolute phase estimator/phase error compensators 107-1 and 107-2, respectively, and feed them back to tap coefficient controllers 110-1 and 110-2 via multipliers 111-1 and 111-2 as error vectors. Thus, the signal vector obtained by the decision is shared in terms of power by the weighting factors of the RAKE combiner, and the errors are calculated between the shared signals and the outputs of individual paths whose phase fluctuations have been compensated, thereby controlling the tap coefficients of the orthogonal filters to minimize the mean square errors.

Thus, the demodulator in accordance with the present invention can be applied to a multipath system. In this case, the weighting based on SIRs of individual paths makes it possible to obtain highly reliable tap coefficient vectors.

The foregoing first and second embodiments employ the frame format, in which the pilot signals are inserted between the information signals. In this case, it is necessary to make the insertion interval of the pilot signals much shorter than fluctuation periods of the propagation paths.

Considering forward link channels (from a base station to mobile stations)'s in a cellular system, signals transmitted from the base station arrive at a particular mobile station through the same propagation path independently of whether they are directed to the particular mobile station or to other users. Accordingly, it would be not necessary to insert the pilot signals, which are used to estimate the fluctuations of the propagation paths, into individual channels of the users. On the contrary, a frame efficiency could be improved by providing a common pilot channel dedicated to the pilot signal, and by sharing the pilot channel among all the users. The following embodiments relate to demodulators used in a system including such a common pilot channel.

EMBODIMENT 3

Figure 12:
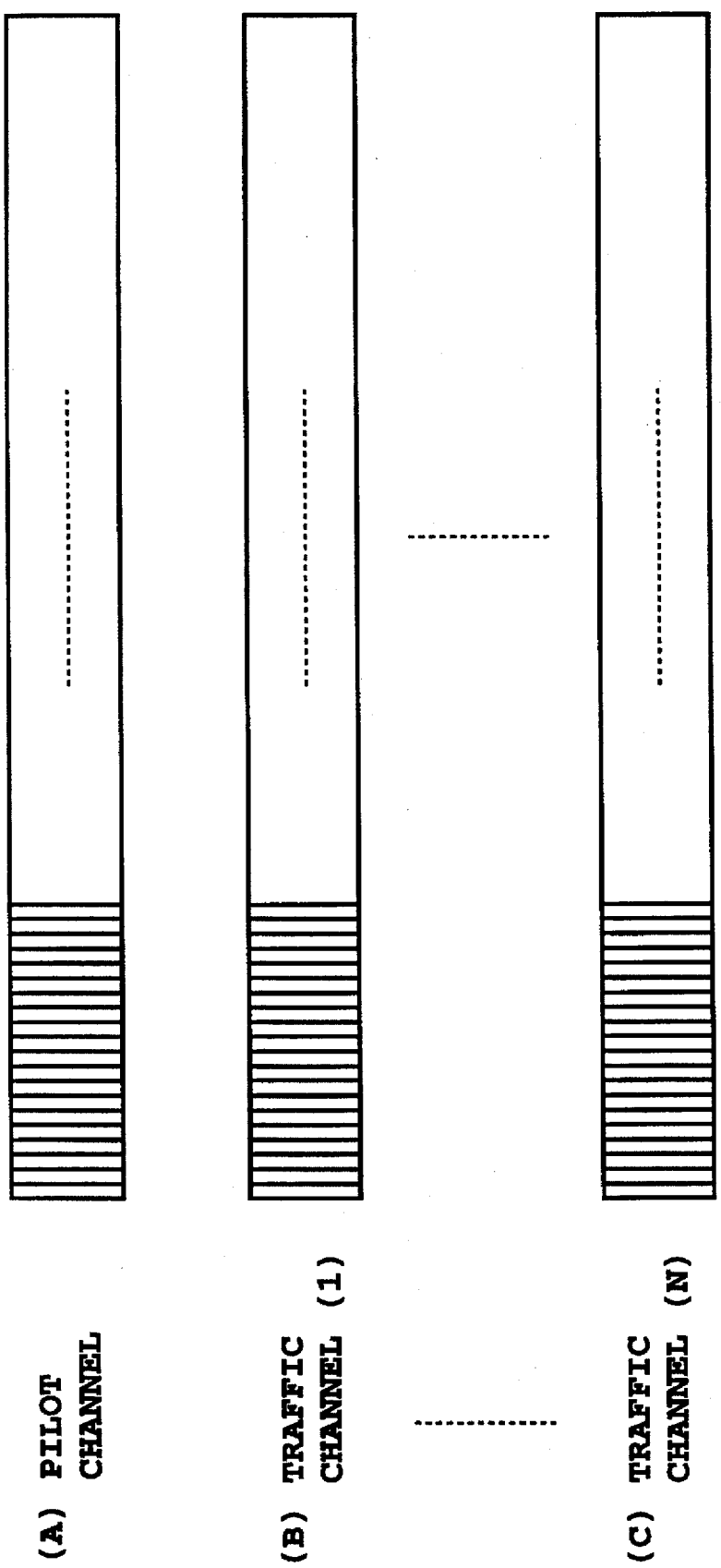
FIG. 12 is a schematic diagram illustrating a channel arrangement of a third embodiment of a CDMA demodulator in accordance with the present invention.

FIG. 12 illustrates a frame arrangement of a forward link channel from the base station to mobile stations, which is used in this embodiment. A single pilot channel is provided for N traffic channels. The pilot channel consists of symbol groups of a known pattern, and is used as a reference signal for the phase compensation of the signals transmitted through respective traffic channels.

Figure 13:
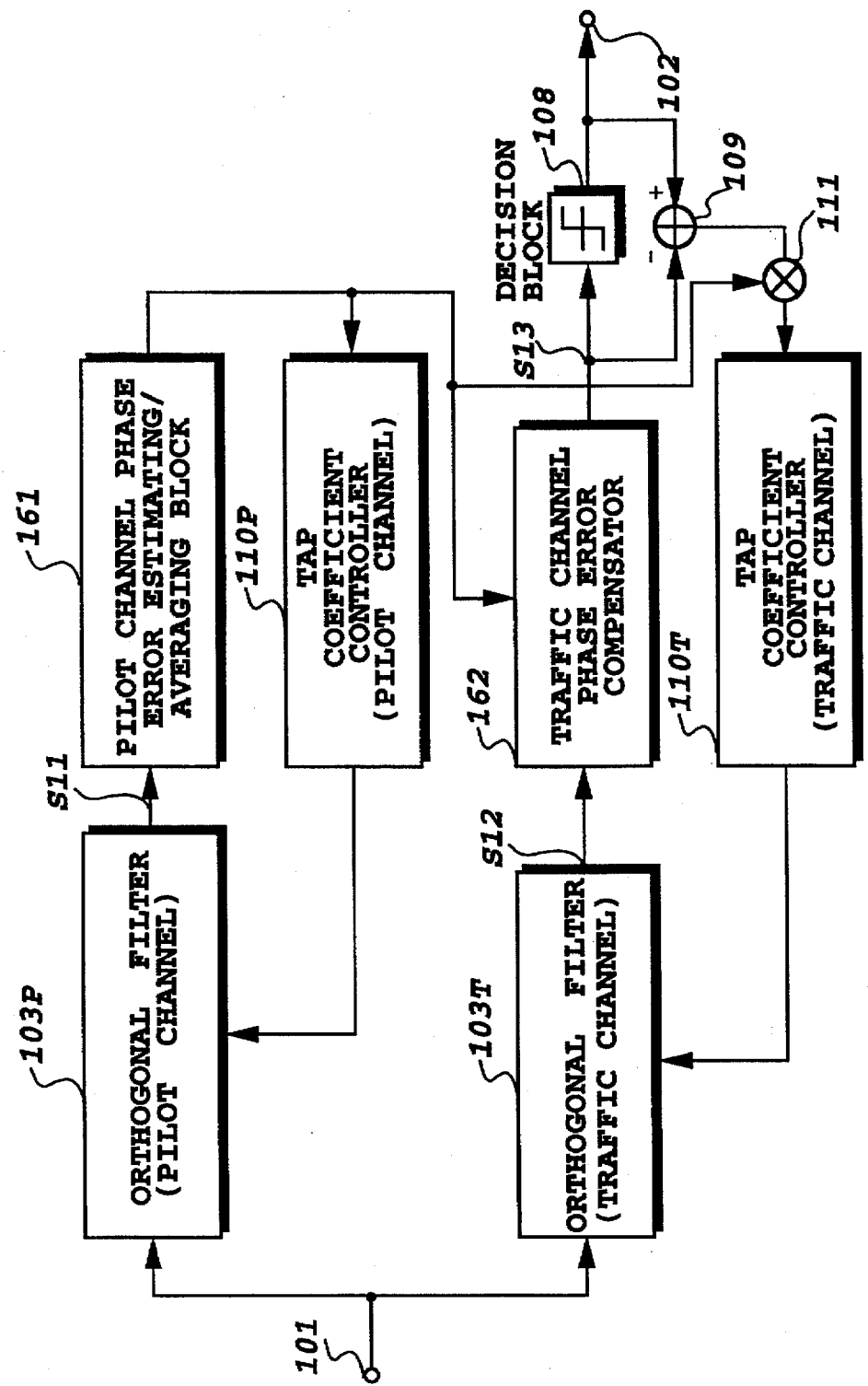
FIG. 13 is a block diagram showing the third embodiment of a CDMA demodulator in accordance with the present invention.

FIG. 13 is a block diagram showing the configuration of the third embodiment of a demodulator in accordance with the present invention. A spread signal applied to the input terminal 101 is fed to an orthogonal filter 103P for the pilot channel and an orthogonal filter 103T for the traffic channel. The orthogonal filters 103P and 103T despread the spread signal by using the tap coefficients generated on the basis of spreading codes, and output narrowband despread signals S11 and S12 in a manner similar to the orthogonal filter 103 in the above-described embodiments. It should be noted here that the pilot channel and the traffic channels employ different spreading codes for despreading.

The output signal S11 of the orthogonal filter 103P corresponds to the pilot signal with a known pattern. Accordingly, calculating the received phase with reference to the pilot signal of a known pattern generated in this demodulator makes it possible to obtain fluctuations in amplitude and phase due to fading. The received signal S11 includes cross-correlation components due to signals associated with other users.

A pilot channel phase error estimating/averaging block 161 averages the received pilot symbols over a predetermined time period to level errors due to instantaneous Rayleigh fading. The mean vector includes the cross-correlation components associated with other users. Then, the tap coefficient controller 110P calculates tap coefficients that will minimize the mean square error of the differences between the mean vector and the received pilot symbol vector, and feeds them back to the orthogonal filter 103P.

The phase compensation for each symbol of the traffic channel is performed by a traffic channel phase error compensator 162 using the pilot symbol in phase with the symbol of the traffic channel. Specifically, the symbol phases of a signal S12 outputted from the orthogonal filter 103T of the traffic channel is corrected by the received phase of the corresponding pilot symbol. The phase compensated signal S13 outputted from the traffic channel phase error compensator 162 is decided by the decision block 108, and the decision result is produced from the output terminal 102 as a decoded output. The output of the decision block 108 is also fed to an error vector calculator 109 which calculates an error vector indicative of differences from the signal S13. The tap coefficient controller 110T calculates the tap coefficients that will minimize the mean square error of the error vector, and feeds them back to the orthogonal filter 103T.

According to the present embodiment, good tracking ability to the Rayleigh fading can be achieved because the phase fluctuations in the propagation path is estimated without interruption using the pilot channel that continually transmits the pilot signal of a known pattern.

EMBODIMENT 4

Figure 14:
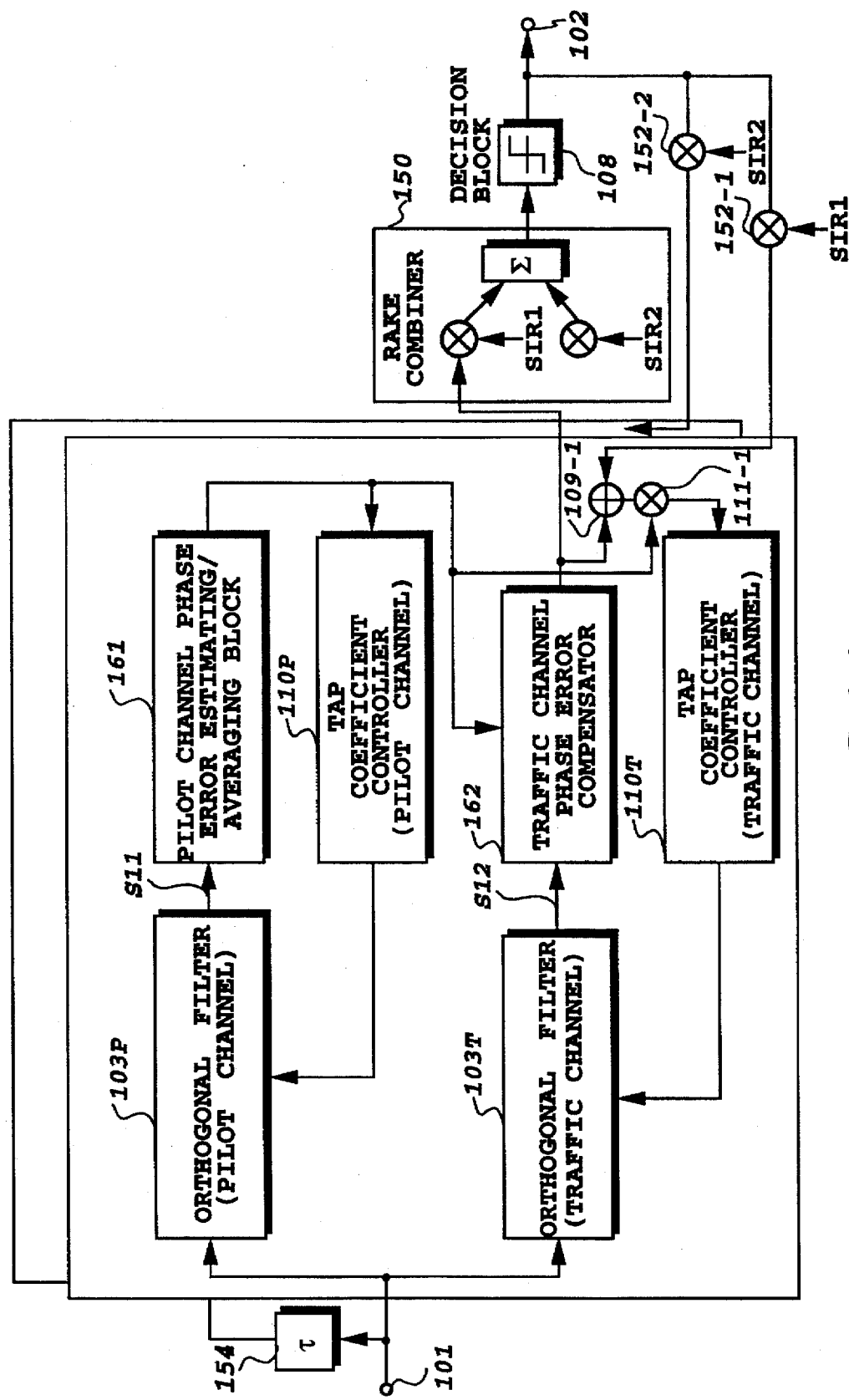
FIG. 14 is a block diagram showing a fourth embodiment of a CDMA demodulator in accordance with the present invention.

FIG. 14 is a block diagram showing a fourth embodiment of a demodulator in accordance with the present invention. This embodiment is implemented by applying the demodulator of the third embodiment to a receiver used in a multipath environment. Since this relationship is analogous to that between the first embodiment as shown in FIG. 5 and the second embodiment as shown in FIG. 11, the corresponding explanations of the second embodiment should be referred to. Thus, the detailed description of the embodiment is omitted here.

EMBODIMENT 5

Figure 15:
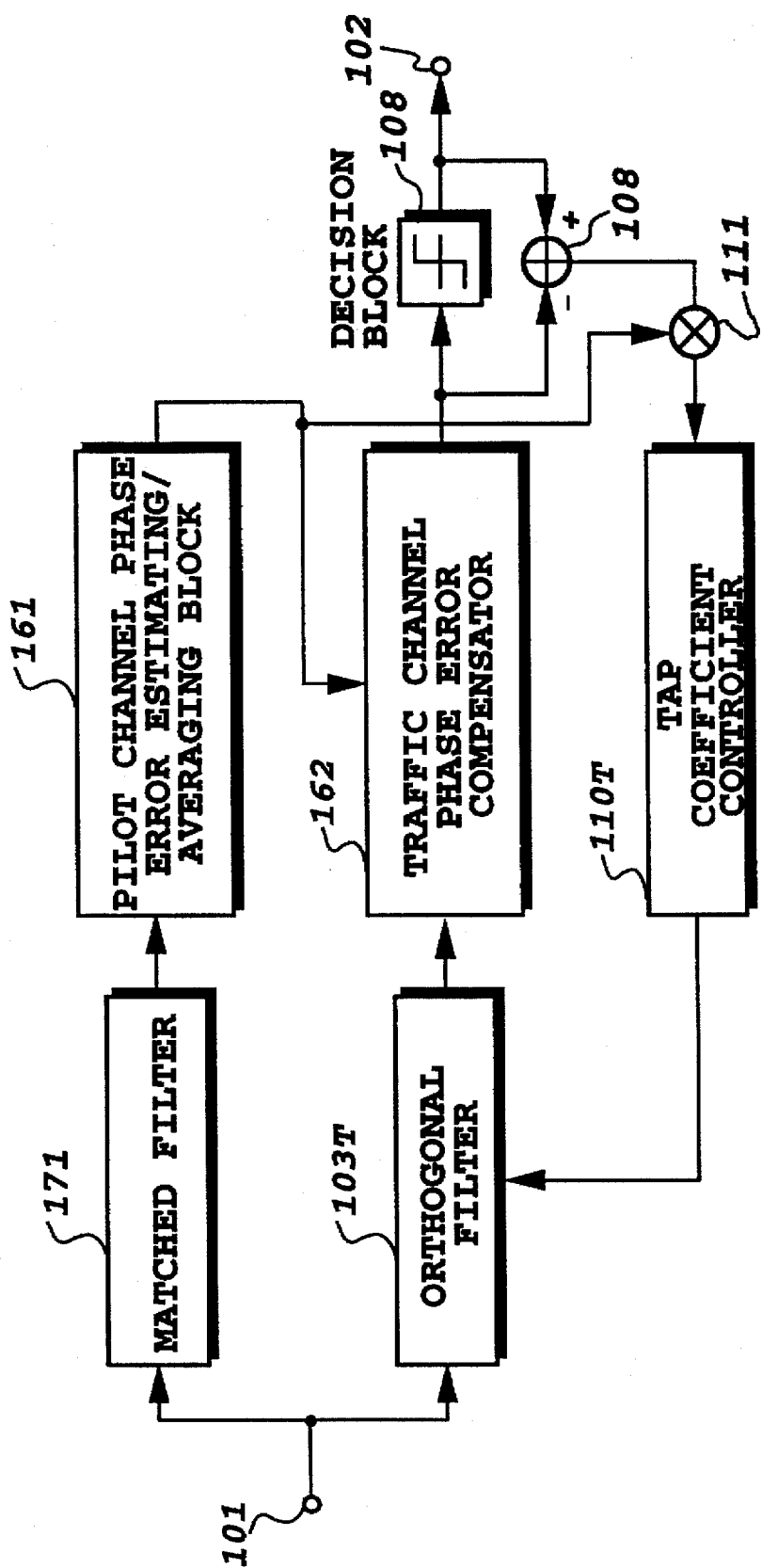
FIG. 15 is a block diagram showing a fifth embodiment of a CDMA demodulator in accordance with the present invention.

FIG. 15 is a block diagram showing a fifth embodiment of a demodulator in accordance with the present invention. This embodiment differs from the third embodiment shown in FIG. 13 in the following.

(1) A matched filter 171 is connected between the input terminal 101 and the pilot channel phase error estimating/averaging block 161 in place of the orthogonal filter 103P.

(2) The tap coefficient controller 110P for the pilot channel is obviated.

Figure 16A:
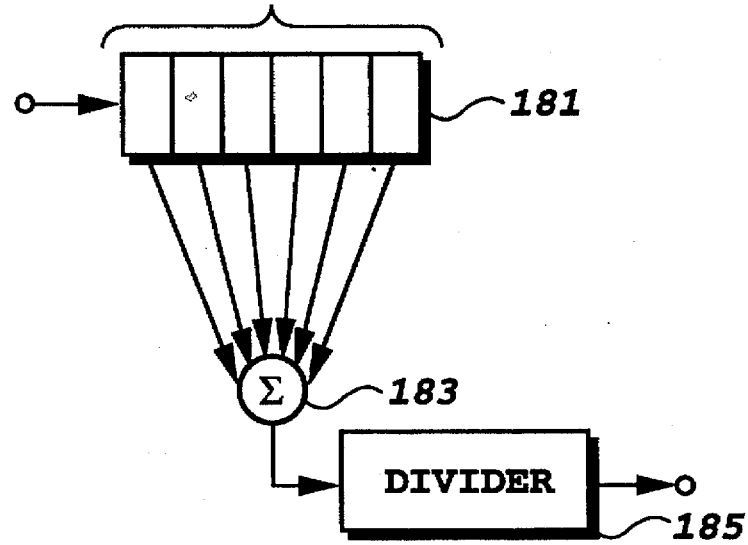
FIGS. 16A and 16B are block diagrams showing an averaging circuit of pilot symbols in the fifth embodiment.
Figure 16B:
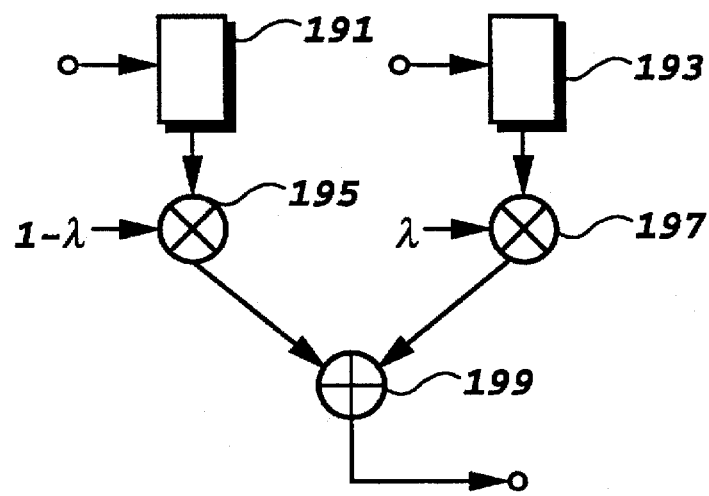

With this arrangement, the configuration becomes simpler and the processing amount becomes less than those of the third embodiment because of the elimination of the tap coefficient controller. However, since the pilot signal includes interference components, it is necessary to calculate the mean of a number of pilot symbols to increase the estimation accuracy. FIGS. 16A and 16B show a configuration of an average circuit of the pilot symbols. It is provided in the pilot channel phase error estimating/averaging block 161, and averages the pilot symbols over a predetermined time interval.

FIG. 16A shows a circuit for calculating an arithmetic mean of the pilot symbols. N pilot symbols stored in a buffer 181 are summed up by an adder 183, and the sum is divided by N by a divider 185.

FIG. 16B calculates a weighted mean of two pilot symbols. Two pilot symbols stored in buffers 191 and 193 are weighted by multipliers 195 and 197, and are summed up by an adder 199. Thus, the mean of the pilot symbols is calculated.

It is considered that the present embodiment is inferior to the third embodiment in the tracking ability to fast fading because it calculates the mean of many pilot symbols. Accordingly, it will be necessary to choose the third embodiment and the present embodiment in accordance with circuit size and fading environment.

EMBODIMENT 6

Figure 17:
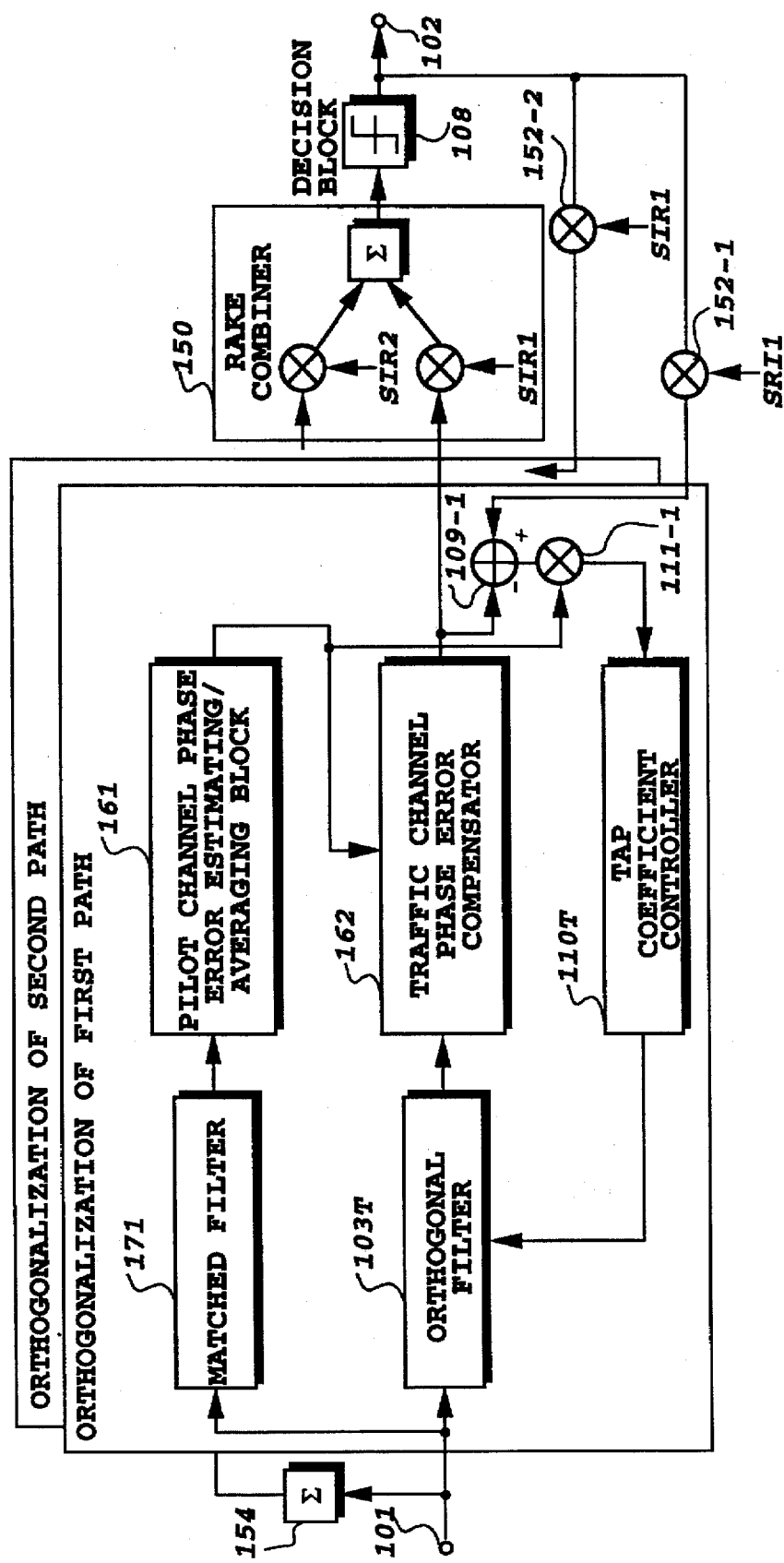
FIG. 17 is a block diagram showing a sixth embodiment of a CDMA demodulator in accordance with the present invention.

FIG. 17 is a block diagram showing a sixth embodiment of a demodulator in accordance with the present invention. This embodiment is implemented by applying the demodulator of the fifth embodiment to a receiver used in a multipath environment. Since this relationship is analogous to that between the first embodiment as shown in FIG. 5 and the second embodiment as shown in FIG. 11, the corresponding explanations of the second embodiment should be referred to. Thus, the detailed description is omitted here.

In this embodiment as in the second and fourth embodiments, the signal vector obtained by the decision is shared in terms of power by the weighting factors of the RAKE combiner, and differences are calculated between the shared signals and the outputs of the paths obtained by compensating the phase fluctuations. Then, the tap coefficients of the orthogonal filters are controlled so that the mean square error of the differences is kept minimum.

What is claimed is:

1. A CDMA (Code Division Multiple Access) demodulator used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, said CDMA demodulator, which demodulates the spread signal by using the spreading code, comprising:

an orthogonal filter including a plurality of delay elements, a plurality of multipliers and an adder, said delay elements providing said spread signal with successive delays each of an amount of 1/m of a chip interval of said spreading code, where m is a positive integer, said multipliers multiplying said spread signal and successively delayed spread signals by tap coefficients obtained on the basis of said spreading code, and said adder summing up outputs of said multipliers, said orthogonal filter despreading said spread signal to generate a despread signal;

absolute phase estimating means for estimating received phases of a received pilot signal by comparing said received pilot signal included in said despread signal with said pilot signal of a known pattern, and for estimating a received phase of each information symbol in said information signal by interpolating said received phases of said received pilot signal;

phase error compensation means for compensating received phase errors of said received pilot signal on the basis of estimated received phases of said received pilot signal, and for compensating a phase error of each said information symbol on the basis of an estimated received phase of said information symbol;

decision means for deciding said pilot signal whose phase has been compensated, and for deciding said information symbol whose phase has been compensated; and tap coefficient control means for calculating said tap coefficients which will minimize a mean square error of differences between an output of said phase error compensation means and an output of said decision means, and for feeding said tap coefficients to said orthogonal filter.

2. The CDMA demodulator as claimed in claim 1, wherein said tap coefficient control means calculates said tap coefficients that will minimize said mean square error for each symbol in said pilot signal, and calculates said tap coefficients that will minimize said mean square error for each symbol in said information signal.

3. The CDMA demodulator as claimed in claim 1, wherein said tap coefficient control means calculates said tap coefficients that will minimize said mean square error for each said pilot signal.

4. The CDMA demodulator as claimed in claim 1, wherein said tap coefficient control means calculates said tap coefficients that will minimize said mean square error for each said pilot signal, and calculates said tap coefficients that will minimize said mean square error for each symbol in said information signal.

5. A CDMA (Code Division Multiple Access) demodulator of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in a multiple access transmission, said CDMA demodulator comprising:

a pilot channel demodulating portion for demodulating said pilot channel; and a traffic channel demodulating portion provided for each said traffic channel for demodulating said traffic channel, wherein said pilot channel demodulating portion comprises:

a pilot channel orthogonal filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel;

phase error estimating/averaging means for estimating received phases of individual received pilot symbols of a received pilot signal included in said despread signal of said pilot channel by comparing said received pilot signal with said pilot signal of a known pattern of said pilot channel, and for obtaining phase differences between said received pilot symbols and an average signal obtained by averaging said received phases of said received pilot symbols; and pilot channel tap coefficient control means for calculating said tap coefficients of said pilot channel, which will minimize a mean square error of said phase differences between said received pilot symbols and said average signal, and for feeding said tap coefficients to said pilot channel orthogonal filter, wherein said traffic channel demodulating portion comprises:

a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding said information symbol; and traffic channel tap coefficient control means for calculating tap coefficients of said traffic channel, and for feeding said tap coefficients to said traffic channel orthogonal filter, and wherein said demodulator further comprises decision means for deciding information symbols whose phases have been compensated, and said traffic channel tap coefficient control means calculates said tap coefficients that will minimize a mean square error of differences between said information symbols whose phases have been compensated and information symbols outputted from said decision means.

6. A CDMA (Code Division Multiple Access) demodulator of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in a multiple access transmission, said CDMA demodulator comprising:

a pilot channel demodulating portion for demodulating said pilot channel; and a traffic channel demodulating portion provided for each said traffic channel for demodulating said traffic channel, wherein said pilot channel demodulating portion comprises:

a matched filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel; and phase error estimating/averaging means for estimating received phases of individual received pilot symbols of a received pilot signal included in said despread signal of said pilot channel by comparing said received pilot signal with said pilot signal of a known pattern of said pilot channel, and for obtaining differences between said received pilot symbols and an average signal obtained by averaging said received phases of said received pilot symbols, wherein said traffic channel demodulating portion comprises:

a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding said information symbol; and traffic channel tap coefficient control means for calculating tap coefficients of said traffic channel, and for feeding said tap coefficients to said traffic channel orthogonal filter, and wherein said demodulator further comprises decision means for deciding information symbols whose phases have been compensated, and said traffic channel tap coefficient control means calculates said tap coefficients that will minimize a mean square error of differences between said information symbols whose phases have been compensated and information symbols outputted from said decision means.

7. A CDMA (Code Division Multiple Access) demodulator used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, said CDMA demodulator, which demodulates the spread signals transmitted through multipaths by using the spreading codes, comprising for each path:

an orthogonal filter including a plurality of delay elements, a plurality of multipliers and an adder, said delay elements providing said spread signal with successive delays each of an amount of 1/m of a chip interval of said spreading code, where m is a positive integer, said multipliers multiplying said spread signal and successively delayed spread signals by tap coefficients obtained on the basis of said spreading code, and said adder summing up outputs of said multipliers, said orthogonal filter despreading said spread signal to generate a despread signal;

absolute phase estimating means for estimating received phases of a received pilot signal by comparing said received pilot signal included in said despread signal with said pilot signal of a known pattern, and for estimating a received phase of each information symbol in said information signal by interpolating said received phases of said received pilot signal;

phase error compensation means for compensating received phase errors of said received pilot signal on the basis of estimated received phases of said received pilot signal, and for compensating a phase error of each said information symbol on the basis of an estimated received phase of said information symbol; and tap coefficient control means for calculating said tap coefficients, and for feeding them to said orthogonal filter, wherein said demodulator further comprises:

a RAKE combiner for RAKE combining said pilot signals and said information symbols whose phases have been compensated, by multiplying for each path of said multipaths said pilot signal and said information symbols by weighting factors; and decision means for deciding a RAKE combined signal, and wherein said tap coefficient control means of said each path calculates said tap coefficients that will minimize mean square error of differences between an output of said phase error compensation means of said each path and signals obtained by sharing in terms of power an output of said decision means in accordance with said weighting factors of said RAKE combiner.

8. The CDMA demodulator as claimed in claim 7, wherein said tap coefficient control means calculates said tap coefficients that will minimize said mean square error for each symbol in said pilot signal, and calculates said tap coefficients that will minimize said mean square error for each symbol in said information signal.

9. The CDMA demodulator as claimed in claim 7, wherein said tap coefficient control means calculates said tap coefficients that will minimize said mean square error for each said pilot signal.

10. The CDMA demodulator as claimed in claim 7, wherein said tap coefficient control means calculates said tap coefficients that will minimize said mean square error for each said pilot signal, and calculates said tap coefficients that will minimize said mean square error for each symbol in said information signal.

11. The CDMA demodulator as claimed in claim 7, wherein said weighting factors are received SIRs (Signal-to-Interference Ratios) of individual paths of said multipaths.

12. A CDMA (Code Division Multiple Access) demodulator of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in multiple access transmission, said CDMA demodulator, which demodulates the spread signals transmitted through multipaths by using the spreading codes, comprising for each path of said multipaths:

a pilot channel demodulating portion for demodulating said pilot channel; and a traffic channel demodulating portion provided for each said traffic channel for demodulating said traffic channel, wherein said pilot channel demodulating portion comprises:

a pilot channel orthogonal filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel;

phase error estimating/averaging means for estimating received phases of individual received pilot symbols of a received pilot signal included in said despread signal of said pilot channel by comparing said received pilot signal with said pilot signal of a known pattern of said pilot channel, and for obtaining phase differences between said received pilot symbols and an average signal obtained by averaging said received phases of said received pilot symbols; and pilot channel tap coefficient control means for calculating said tap coefficients of said pilot channel, which will minimize a mean square error of said phase differences between said received pilot symbols and said average signal, and for feeding said tap coefficients to said pilot channel orthogonal filter, wherein said traffic channel demodulating portion comprises:

a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding said information symbol; and traffic channel tap coefficient control means for calculating tap coefficients of said traffic channel, and for feeding said tap coefficients to said traffic channel orthogonal filter, and wherein said demodulator further comprises:

a RAKE combiner for RAKE combining said information symbols whose phases have been compensated, by multiplying for each path of said multipaths said information symbols by weighting factors; and decision means for deciding a RAKE combined signal, and wherein said traffic channel tap coefficient control means of said each path calculates said tap coefficients that will minimize mean square error of differences between an output of said traffic channel phase error compensation means of said each path and one of signals obtained by sharing in terms of power an output of said decision means in accordance with said weighting factors of said RAKE combiner.

13. The CDMA demodulator as claimed in claim 12, wherein said weighting factors are received SIRs (Signal-to-Interference Ratios) of individual paths of said multipaths.

14. A CDMA (Code Division Multiple Access) demodulator of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in multiple access transmission, said CDMA demodulator, which demodulates the spread signals transmitted through multipaths by using the spreading codes, comprising for each path of said multipaths:

a pilot channel demodulating portion for demodulating said pilot channel; and a traffic channel demodulating portion provided for each said traffic channel for demodulating said traffic channel, wherein said pilot channel demodulating portion comprises:

a pilot channel matched filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel matched filter despreading said spread signal of said pilot channel to generate a despread signal of said pilot channel; and phase error estimating/averaging means for estimating received phases of individual received pilot symbols of a received pilot signal included in said despread signal of said pilot channel by comparing said received pilot signal with said pilot signal of a known pattern of said pilot channel, and for obtaining differences between said received pilot symbols and an average signal obtained by averaging said received phases of said received pilot symbols, wherein said traffic channel demodulating portion comprises:

a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding said information symbol; and traffic channel tap coefficient control means for calculating tap coefficients of said traffic channel, and for feeding said tap coefficients to said traffic channel orthogonal filter, and wherein said demodulator further comprises:

a RAKE combiner for RAKE combining said information symbols whose phases have been compensated, by multiplying for each path of said multipaths said information symbols by weighting factors; and decision means for deciding a RAKE combined signal, and wherein said traffic channel tap coefficient control means of said each path calculates said tap coefficients that will minimize mean square error of differences between an output of said traffic channel phase error compensation means of said each path and one of signals obtained by sharing in terms of power an output of said decision means in accordance with said weighting factors of said RAKE combiner.

15. The CDMA demodulator as claimed in claim 14, wherein said weighting factors are received SIRs (Signal-to-Interference Ratios) of individual paths of said multipaths.

16. A CDMA (Code Division Multiple Access) transmission system carrying out communications between a base station and mobile stations in multiple access transmission by using spread signals generated by spreading information signals into wideband signals using spreading codes whose rate is higher than a transmission rate of said information signals, said CDMA transmission system including forward link channels from the base station to the mobile stations, each of said forward link channels comprising:

at least one pilot channel for transmitting only a pilot signal of a known pattern; and a plurality of traffic channels for transmitting said information signals, wherein a demodulator of a receiver of said mobile stations comprises:

a pilot channel demodulating portion for demodulating said pilot channel; and a traffic channel demodulating portion provided for each said traffic channel for demodulating said traffic channel, wherein said pilot channel demodulating portion comprises:

a pilot channel filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel;

phase error estimating/averaging means for estimating received phases of individual received pilot symbols of a received pilot signal included in said despread signal of said pilot channel by comparing said received pilot signal with said pilot signal of a known pattern of said pilot channel, and for obtaining phase differences between said received pilot symbols and an average signal obtained by averaging said received phases of said received pilot symbols; and pilot channel tap coefficient control means for calculating said tap coefficients of said pilot channel, which will minimize a mean square error of said phase differences between said received pilot symbols and said average signal, and for feeding said tap coefficients to said pilot channel orthogonal filter, wherein said traffic channel demodulating portion comprises:

a traffic channel orthogonal filter including plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding to said information symbol; and traffic channel tap coefficient control means for calculating tap coefficients of said traffic channel, and for feeding said tap coefficients to said traffic channel orthogonal filter, and wherein said demodulator further comprises decision means for deciding information symbols whose phases have been compensated, and said traffic channel tap coefficient control means calculates said tap coefficients that will minimize a mean square error of differences between said information symbols whose phases have been compensated and information symbols outputted from said decision means.

17. A CDMA (Code Division Multiple Access) transmission system carrying out communications between a base station and mobile stations in multiple access transmission by using spread signals generated by spreading information signals into wideband signals using spreading codes whose rate is higher than a transmission rate of said information signals, said CDMA transmission system including forward link channels from the base station to the mobile stations, each of said forward link channels comprising:

- at least one pilot channel for transmitting only a pilot signal of a known pattern; and
- a plurality of traffic channels for transmitting said information signals, wherein a demodulator of a receiver of said mobile stations comprises:

- a pilot channel demodulating portion for demodulating said pilot channel; and
- a traffic channel demodulating portion provided for each said traffic channel for demodulating said traffic channel, wherein said pilot channel demodulating portion comprises:

- a matched filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel; and
- phase error estimating/averaging means for estimating received phases of individual received pilot symbols of a received pilot signal included in said despread signal of said pilot channel by comparing said received pilot signal with said pilot signal of a known pattern of said pilot channel, and for obtaining differences between said received pilot symbols and an average signal obtained by averaging said received phases of said received pilot symbols, wherein said traffic channel demodulating portion comprises:

- a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;
- traffic channel phase error compensation means for compensating a received phase of each said information symbol in said information signal included in said despread signal of said traffic channel on the basis of said received phase of said pilot symbol corresponding to said information symbol; and
- traffic channel tap coefficient control means for calculating tap coefficients of said traffic channel, and for feeding said tap coefficients to said traffic channel orthogonal filter, and wherein said demodulator further comprises decision means for deciding information symbols whose phases have been compensated, and said traffic channel tap coefficient control means calculates said tap coefficients that will minimize a mean square error of differences between said information symbols whose phases have been compensated and information symbols outputted from said decision means.

18. A CDMA (Code Division Multiple Access) transmission system carrying out communications between a base station and mobile stations in multiple access transmission by using spread signals generated by spreading information signals into wideband signals using spreading codes whose rate is higher than a transmission rate of said information signals, said CDMA transmission system including forward link channels from the base station to the mobile stations, each of said forward link channels comprising:

- at least one pilot channel for transmitting only a pilot signal of a known pattern; and
- a plurality of traffic channels for transmitting said information signals, wherein a demodulator of a receiver of said mobile stations comprises for each path of said multipaths:

- a pilot channel demodulating portion for demodulating said pilot channel; and
- a traffic channel demodulating portion provided for each said traffic channel for demodulating said traffic channel, wherein said pilot channel demodulating portion comprises:

- a pilot channel orthogonal filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel;
- phase error estimating/averaging means for estimating received phases of individual received pilot symbols of a received pilot signal included in said despread signal of said pilot channel by comparing said received pilot signal with said pilot signal of a known pattern of said pilot channel, and for obtaining phase differences between said received pilot symbols and an average signal obtained by averaging said received phases of said received pilot symbols; and
- pilot channel tap coefficient control means for calculating said tap coefficients of said pilot channel, which will minimize a mean square error of said phase differences between said received pilot symbols and said average signal, and for feeding said tap coefficients to said pilot channel orthogonal filter, wherein said traffic channel demodulating portion comprises:

- a traffic channel orthogonal filter including plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding to said information symbol; and traffic channel tap coefficient control means for calculating tap coefficients of said traffic channel, and for feeding said tap coefficients to said traffic channel orthogonal filter, and wherein said demodulator further comprises:

a RAKE combiner for RAKE combining said pilot signal and said information symbols whose phases have been compensated, by multiplying for each path of said multipaths said pilot signal and said information symbols by weighing factors; and decision means for deciding a RAKE combined signal, and wherein said traffic channel tap coefficient control means of said each path calculates said tap coefficients that will minimize mean square error of differences between an output of said traffic channel phase error compensation means of said each path and one of signals obtained by sharing in terms of power an output of said decision means in accordance with said weighing factors of said RAKE combiner.

19. A CDMA (Code Division Multiple Access) transmission system carrying out communications between a base station and mobile stations in multiple access transmission by using spread signals generated by spreading information signals into wideband signals using spreading codes whose rate is higher than a transmission rate of said information signals, said CDMA transmission system including forward link channels from the base station to the mobile stations, each of said forward link channels comprising:

at least one pilot channel for transmitting only a pilot signal of a known pattern; and a plurality of traffic channels for transmitting said information signals, wherein a demodulator of a receiver of said mobile stations comprises for each path of said multipaths:

a pilot channel demodulating portion for demodulating said pilot channel; and a traffic channel demodulating portion provided for each said traffic channel for demodulating said traffic channel, wherein said pilot channel demodulating portion comprises:

a pilot channel matched filter including a plurality of delay elements, a plurality of multipliers and an adder, said delay elements providing said spread signal of said pilot channel with successive delays each of an amount of 1/m of a chip interval of said spreading codes, where m is a positive integer, said multipliers multiplying said spread signal and successively delayed spread signals of said pilot channel by tap coefficients of said pilot channel obtained on the basis of said spreading code of said pilot channel, and said adder summing up outputs of said multipliers, said pilot channel orthogonal filter despreading said spread signal of said pilot channel to generate a despread signal of said pilot channel; and phase error estimating/averaging means for estimating received phases of individual received pilot symbols of a received pilot signal included in said despread signal of said pilot channel by comparing said received pilot signal with said pilot signal of a known pattern of said pilot channel, and for obtaining phase differences between said received pilot symbols and an average signal obtained by averaging said received phases of said received pilot symbols, wherein said traffic channel demodulating portion comprises:

a traffic channel orthogonal filter including a plurality of delay elements, a plurality of multipliers and an adder, said delay elements providing said spread signal of said traffic channel with successive delays each of an amount of 1/m of a chip interval of said spreading codes, where m is a positive integer, said multipliers multiplying said spread signal and successively delayed spread signals of said traffic channel by tap coefficients of said traffic channel obtained on the basis of said spreading code of said traffic channel, and said adder summing up outputs of said multipliers, said traffic channel orthogonal filter despreading said spread signal of said traffic channel to generate a despread signal of said traffic channel;

traffic channel phase error compensation means for compensating a received phase of each said information symbol in said information signal included in said despread signal of said traffic channel on the basis of said received phase of said pilot symbol corresponding to said information symbol; and traffic channel tap coefficient control means for calculating tap coefficients of said traffic channel, and for feeding said tap coefficients to said traffic channel orthogonal filter, and wherein said demodulator further comprises:

a RAKE combiner for RAKE combining said pilot signal and said information symbols whose phases have been compensated, by multiplying for each path of said multipaths said pilot signal and said information symbols by weighing factors; and decision means for deciding a RAKE combined signal, and wherein said traffic channel tap coefficient control means of said each path calculates said tap coefficients that will minimize mean square error of differences between an output of said traffic channel phase error compensation means of said each path and one of signals obtained by sharing in terms of power an output of said decision means in accordance with said weighing factors of said RAKE combiner.

20. A CDMA (Code Division Multiple Access) demodulation method used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, said CDMA demodulation method, which demodulates the spread signal by using the spreading code, comprising:

a step of outputting a despread signal by providing said spread signal with successive delays each of an amount of 1/m of a chip interval of said spreading code, where m is a positive integer, by multiplying said spread signal and successively delayed spread signals by tap coefficients obtained on the basis of said spreading code, and by summing up results of multiplications to despread said spread signal;

an absolute phase estimating step of estimating received phases of a received pilot signal by comparing said received pilot signal included in said despread signal with said pilot signal of a known pattern, and of estimating a received phase of each information symbol in said information signal by interpolating said received phases of said received pilot signal;

a phase error compensation step of compensating received phase errors of said received pilot signal on the basis of estimated received phases of said received pilot signal, and of compensating a phase error of each said information symbol on the basis of an estimated received phase of said information symbol;

a decision step of deciding said pilot signal whose phase has been compensated, and of deciding said information symbol whose phase has been compensated; and a tap coefficient calculation step of calculating said tap coefficients which will minimize a mean square error of differences between an output of said phase error compensation step and an output of said decision step.

21. The CDMA demodulation method as claimed in claim 20, wherein said tap coefficient calculation step calculates said tap coefficients that will minimize said mean square error for each symbol in said pilot signal, and calculates said tap coefficients that will minimize said mean square error for each symbol in said information signal.

22. The CDMA demodulation method as claimed in claim 20, wherein said tap coefficient calculation step calculates said tap coefficients that will minimize said mean square error for each said pilot signal.

23. The CDMA demodulation method as claimed in claim 20, wherein said tap coefficient calculation step calculates said tap coefficients that will minimize said mean square error for each said pilot signal, and calculates said tap coefficients that will minimize said mean square error for each symbol in said information signal.

24. A CDMA (Code Division Multiple Access) demodulation method of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in a multiple access transmission, said CDMA demodulation method comprising:

a step of outputting a despread signal of said pilot signal by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining phase differences between said received pilot symbols and an average signal obtained by averaging said received phases of said received pilot symbols;

a step of calculating said tap coefficients of said pilot channel, which will minimize a mean square error of said phase differences between said received pilot symbols and said average signal;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding said information symbol;

a decision step of deciding information symbols whose phases have been compensated; and a step of calculating said tap coefficients that will minimize a mean square error of differences between said information symbols whose phases have been compensated and information symbols which have been decided.

25. A CDMA (Code Division Multiple Access) demodulation method of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in a multiple access transmission, said CDMA demodulation method comprising:

a step of outputting a despread signal of said pilot signal by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining differences between said received pilot symbols and an average signal obtained by averaging said received phases of said received pilot symbols;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding said information symbol;

a step of deciding information symbols whose phases have been compensated; and a step of calculating said tap coefficients that will minimize a mean square error of differences between said information symbols whose phases have been compensated and information symbols which have been decided.

26. A CDMA (Code Division Multiple Access) demodulation method used in a CDMA transmission which performs multiple access transmission by spreading a signal, which includes a frame consisting of a pilot signal of a known pattern and an information signal, into a wideband signal using a spreading code faster than each information symbol in the information signal, thereby generating a spread signal, said CDMA demodulation method, which demodulates the spread signals transmitted through multipaths by using the spreading codes, comprising for each path:

a step of outputting a despread signal by providing said spread signal with successive delays each of an amount of 1/m of a chip interval of said spreading code, where m is a positive integer, by multiplying said spread signal and successively delayed spread signals by tap coefficients obtained on the basis of said spreading code, and by summing up results of multiplications to despread said spread signal;

an absolute phase estimating step of estimating received phases of a received pilot signal by comparing said received pilot signal included in said despread signal with said pilot signal of a known pattern, and of estimating a received phase of each information symbol in said information signal by interpolating said received phases of said received pilot signal;

a phase error compensation step of compensating received phase errors of said received pilot signal on the basis of estimated received phases of said received pilot signal, and of compensating a phase error of each said information symbol on the basis of an estimated received phase of said information symbol;

a RAKE combining step of RAKE combining said pilot signals and said information symbols whose phases have been compensated, by multiplying for each path of said multipaths said pilot signal and said information symbols by weighting factors;

a decision step of deciding a RAKE combined signal; and a step of calculating said tap coefficients that will minimize mean square error of differences between an output of said phase error compensation step of said each path and signals obtained by sharing in terms of power an output of said decision step in accordance with said weighting factors of said RAKE combining.

27. The CDMA demodulation method as claimed in claim 26, wherein said tap coefficient calculation step calculates said tap coefficients that will minimize said mean square error for each symbol in said pilot signal, and calculates said tap coefficients that will minimize said mean square error for each symbol in said information signal.

28. The CDMA demodulation method as claimed in claim 26, wherein said tap coefficient calculation step calculates said tap coefficients that will minimize said mean square error for each said pilot signal.

29. The CDMA demodulation method as claimed in claim 26, wherein said tap coefficient calculation step calculates said tap coefficients that will minimize said mean square error for each said pilot signal, and calculates said tap coefficients that will minimize said mean square error for each symbol in said information signal.

30. The CDMA demodulation method as claimed in claim 26, wherein said weighting factors are received SIRs (Signal-to-Interference Ratios) of individual paths of said multipaths.

31. A CDMA (Code Division Multiple Access) demodulation method of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in multiple access transmission, said CDMA demodulation method, which demodulates the spread signals transmitted through multipaths by using the spreading codes, comprising for each path of said multipaths:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining phase differences between said received pilot symbols and an average signal obtained by averaging said received phases of said received pilot symbols;

a step of calculating said tap coefficients of said pilot channel, which will minimize a mean square error of said phase differences between said received pilot symbols and said average signal;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding said information symbol;

a RAKE combining step of RAKE combining said information symbols whose phases have been compensated, by multiplying for each path of said multipaths said information symbols by weighting factors;

a decision step of deciding a RAKE combined signal; and a step of calculating said tap coefficients that will minimize mean square error of differences between an output of said traffic channel phase error compensation step of said each path and one of signals obtained by sharing in terms of power an output of said decision step in accordance with said weighting factors of said RAKE combining.

32. The CDMA demodulation method as claimed in claim 31, wherein said weighting factors are received SIRs (Signal-to-Interference Ratios) of individual paths of said multipaths.

33. A CDMA (Code Division Multiple Access) demodulation method of a receiver of a mobile station used in a CDMA transmission system whose forward link channels from a base station to mobile stations include at least one pilot channel and multiple traffic channels, said pilot channel transmitting only a pilot signal of a known pattern, and said traffic channels transmitting information signals, said CDMA transmission system spreading said pilot signal and said information signals into wideband signals by using spreading codes faster than a transmission rate of said pilot signal and said information signals, thereby generating spread signals to perform communications between said base station and said mobile stations in multiple access transmission, said CDMA demodulation method, which demodulates the spread signals transmitted through multipaths by using the spreading codes, comprising for each path of said multipaths:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining differences between said received pilot symbols and an average signal obtained by averaging said received phases of said received pilot symbols;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding said information symbol;

a RAKE combining step of RAKE combining said information symbols whose phases have been compensated, by multiplying for each path of said multipaths said information symbols by weighting factors;

a decision step of deciding a RAKE combined signal; and a step of calculating said tap coefficients that will minimize mean square error of differences between an output of said traffic channel phase error compensation step of said each path and one of signals obtained by sharing in terms of power an output of said decision step in accordance with said weighting factors of said RAKE combining.

34. The CDMA demodulation method as claimed in claim 33, wherein said weighting factors are received SIRs (Signal-to-Interference Ratios) of individual paths of said multipaths.

35. A CDMA (Code Division Multiple Access) transmission method carrying out communications between a base station and mobile stations in multiple access transmission by using spread signals generated by spreading information signals into wideband signals using spreading codes whose rate is higher than a transmission rate of said information signals, said CDMA method comprising:

a step of transmitting from said base station to said mobile stations only a pilot signal of a known pattern through at least one pilot channel; and a step of transmitting said information signals through a plurality of traffic channels, wherein a demodulation method of a receiver of said mobile stations comprises:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining phase differences between said received pilot symbols and an average signal obtained by averaging said received phases of said received pilot symbols;

a pilot channel tap coefficient calculation step of calculating said tap coefficients of said pilot channel, which will minimize a mean square error of said phase differences between said received pilot symbols and said average signal;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding to said information symbol;

a decision step of deciding information symbols whose phases have been compensated; and a step of calculating said tap coefficients that will minimize a mean square error of differences between said information symbols whose phases have been compensated and information symbols which have been decided.

36. The CDMA transmission method as claimed in claim 35, wherein a demodulation method of a receiver of said mobile stations comprises for each path of said multipaths:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining differences between said received pilot symbols and an average signal obtained by averaging said received phases of said received pilot symbols;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplications to despread said spread signal of said traffic channel;

a traffic channel phase error compensation step of compensating a received phase of each said information symbol in said information signal included in said despread signal of said traffic channel on the basis of said received phase of said pilot symbol corresponding said information symbol;

a RAKE combining step of RAKE combining said pilot signal and said information symbols whose phases have been compensated, by multiplying for each path of said multipaths said pilot signal and said information symbols by weighting factors;

a decision step of deciding a RAKE combined signal; and a step of calculating said tap coefficients that will minimize mean square error of differences between an output of said traffic channel phase error compensation step of said each path and one of signals obtained by sharing in terms of power an output of said decision step in accordance with said weighting factors of said RAKE combining.

37. A CDMA (Code Division Multiple Access) transmission method carrying out communications between a base station and mobile stations in multiple access transmission by using spread signals generated by spreading information signals into wideband signals using spreading codes whose rate is higher than a transmission rate of said information signals, said CDMA method comprising:

a step of transmitting from said base station to said mobile stations only a pilot signal of a known pattern through at least one pilot channel; and a step of transmitting said information signals through a plurality of traffic channels, wherein a demodulation method of a receiver of said mobile stations comprises:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining phase differences between said received pilot symbols and an average signal obtained by averaging said received phases of said received pilot symbols;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplication to despread said spread signal of said traffic channel;

a traffic channel phase error compensation step of compensating a received phase of each said information symbol in said information signal included in said despread signal of said traffic channel on the basis of said received phase of said pilot symbol corresponding to said information symbol;

a decision step of deciding information symbols whose phases have been compensated; and a step of calculating said tap coefficients that will minimize a mean square error of differences between said information symbols whose phases have been compensated and information symbols which have been decided.

38. A CDMA (Code Division Multiple Access) transmission method carrying out communications between a base station and mobile stations in multiple access transmission by using spread signals generated by spreading information signals into wideband signals using spreading codes whose rate is higher than a transmission rate of said information signals, said CDMA method comprising:

a step of transmitting from said base station to said mobile stations only a pilot signal of a known pattern through at least one pilot channel; and a step of transmitting said information signals through a plurality of traffic channels, wherein a demodulation method of a receiver of said mobile stations comprises for each path of said multipaths:

a step of outputting a despread signal of said pilot channel by providing said spread signal of said pilot channel with successive delays each of an amount of 1/m of a chip interval of said spreading codes, where m is a positive integer, by multiplying said spread signal and successively delayed spread signals of said pilot channel by tap coefficients of said pilot channel obtained on the basis of said spreading code of said pilot channel, and by summing up results of multiplications to despread said spread signal of said pilot channel;

a phase error estimating/averaging step of estimating received phases of individual received pilot symbols of a received pilot signal included in said despread signal of said pilot channel by comparing said received pilot signal with said pilot signal of a known pattern of said pilot channel, and of obtaining phase differences between said received pilot symbols and an average signal obtained by averaging said received phases of said received pilot symbols;

a step of calculating said tap coefficients of said pilot channel, which will minimize a mean square error of said phase differences between said received pilot symbols and said average signal;

a step of outputting a despread signal of said traffic channel by providing said spread signal of said traffic channel with successive delays each of an amount of 1/m of a chip interval of said spreading codes, where m is a positive integer, by multiplying said spread signal and successively delayed spread signals of said traffic channel by tap coefficients of said traffic channel obtained on the basis of said spreading code of said traffic channel, and by summing up results of multiplication to despread said spread signal of said traffic channel;

a traffic channel phase error compensation step of compensating a received phase of each said information symbol in said information signal included in said despread signal of said traffic channel on the basis of said received phase of said pilot symbol corresponding to said information symbol;

a RAKE combining step of RAKE combining said pilot signal and said information symbols whose phases have been compensated, by multiplying for each path of said multipaths said pilot signal and said information symbols by weighing factors;

a decision step of deciding a RAKE combined signal; and a step of calculating said tap coefficients that will minimize mean square error of differences between an output of said traffic channel phase error compensation step of said each path and one of signals obtained by sharing in terms of power an output of said decision step in accordance with said weighing factors of said RAKE combining.

* * * * *